(12) United States Patent
Sato

(10) Patent No.: US 6,212,446 B1
(45) Date of Patent: Apr. 3, 2001

(54) METHOD AND APPARATUS FOR DETECTING OUT-OF-STEP IN ELECTRIC POWER SYSTEM

(75) Inventor: Masahiro Sato, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/044,234

(22) Filed: Mar. 19, 1998

(30) Foreign Application Priority Data

Apr. 2, 1997 (JP) .................................................. 9-083932
Jan. 7, 1998 (JP) ................................................ 10-001330

(51) Int. Cl.⁷ .................................................. G05D 17/00
(52) U.S. Cl. .......................................... 700/293; 700/292
(58) Field of Search ................................. 700/293, 292, 700/286, 90

(56) References Cited

U.S. PATENT DOCUMENTS

| | | | |
|---|---|---|---|
| 4,281,386 | * 7/1981 | Kondow et al. | 364/492 |
| 4,455,612 | * 6/1984 | Girgis et al. | 264/528.29 |
| 4,484,246 | * 11/1984 | Andow | 361/71 |
| 4,742,288 | 5/1988 | Sugimoto et al. | |
| 4,812,995 | * 3/1989 | Girgis et al. | 364/481 |
| 4,835,706 | * 5/1989 | Asahi | |
| 5,448,491 | * 9/1995 | Janke et al. | 702/58 |
| 5,539,655 | * 7/1996 | Sato | 364/528.26 |
| 5,808,376 | * 9/1998 | Gordon et al. | |
| 5,854,995 | * 12/1998 | Plis et al. | 702/72 |

FOREIGN PATENT DOCUMENTS

6284578 * 10/1994 (JP) .

OTHER PUBLICATIONS

Patent Abstracts of Japan, vol. 1996, No. 5, May 31, 1996, JP 023627 A, Jan. 23, 1996.

* cited by examiner

Primary Examiner—Robert Beausoleil
Assistant Examiner—Rita Ziemer
(74) Attorney, Agent, or Firm—Oblon, Spivak, McClelland, Maier & Neustadt, P.C.

(57) ABSTRACT

A method for detecting an out-of-step in an electric power system in which two power systems are connected at both sides of a transmission line. The method includes the steps of, a voltage and current taking step for taking in a voltage and a current of the electric power system at regular intervals, a phase angle difference computing step for computing a phase angle difference between the voltage and the current taken by the voltage and current taking step, and an out-of-step judging step for receiving the phase angle difference, for obtaining a change amount in the phase angle differences at every measuring interval and for judging that an out-of-step occurs between the two power systems in the electric power system when the change amount in the phase angle differences is below a predetermined threshold value for detecting sudden change in phase angle and the phase angle difference is above a preset out-of-step judging phase angle difference.

11 Claims, 20 Drawing Sheets

FIG.3
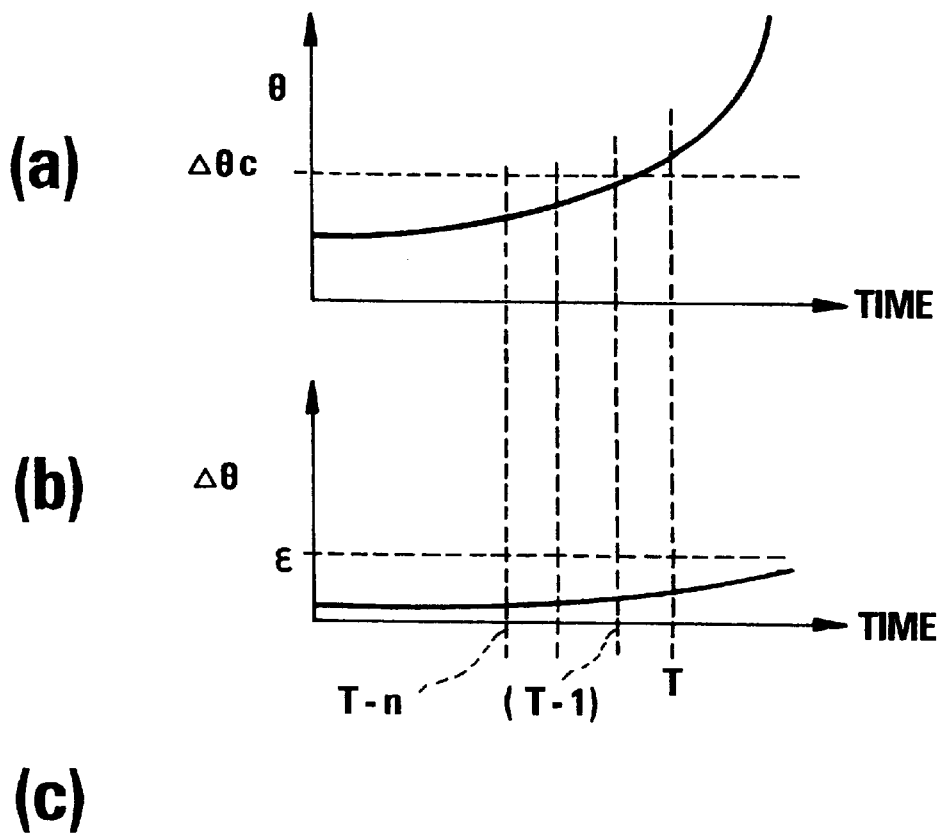
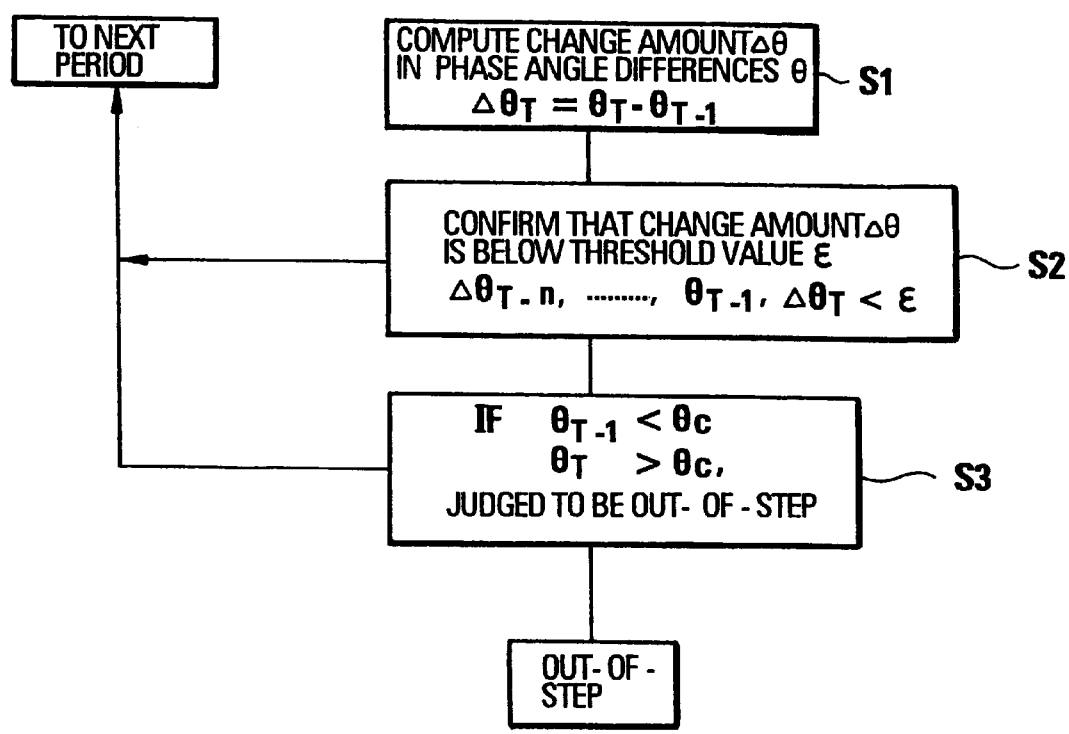

FIG.5
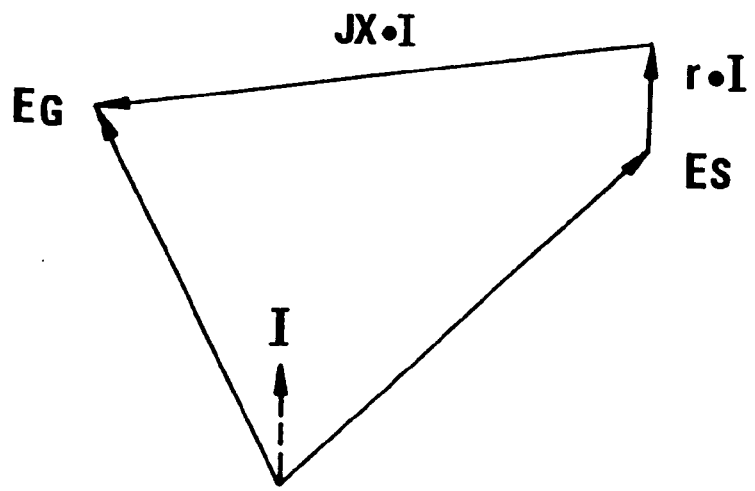
(a)
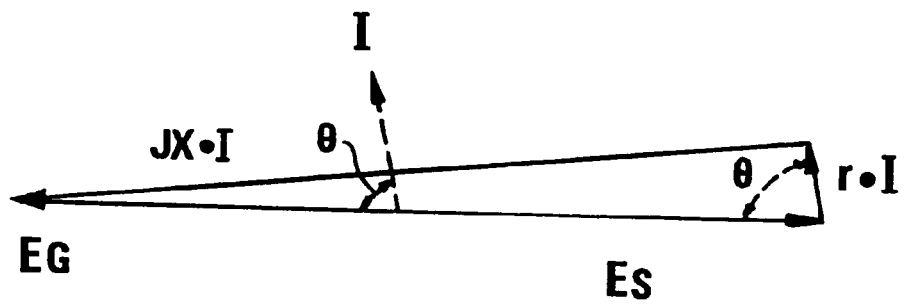
(b)

FIG.7
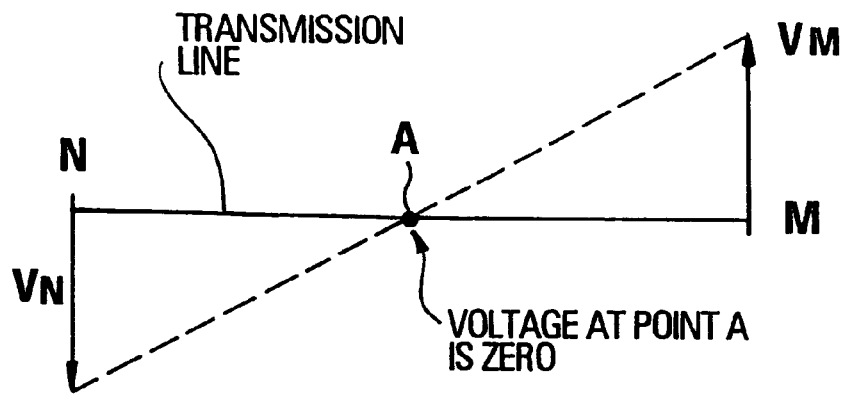
(a)
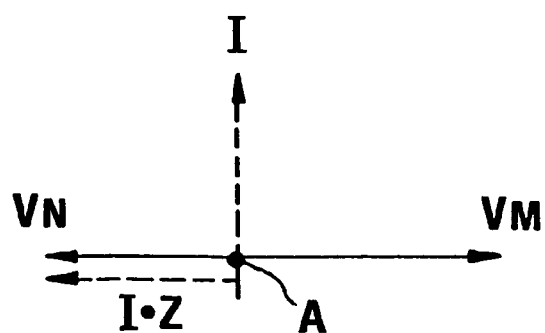
VOLTAGE AT POINT A ($V_N - I \cdot Z$) = 0
(b)

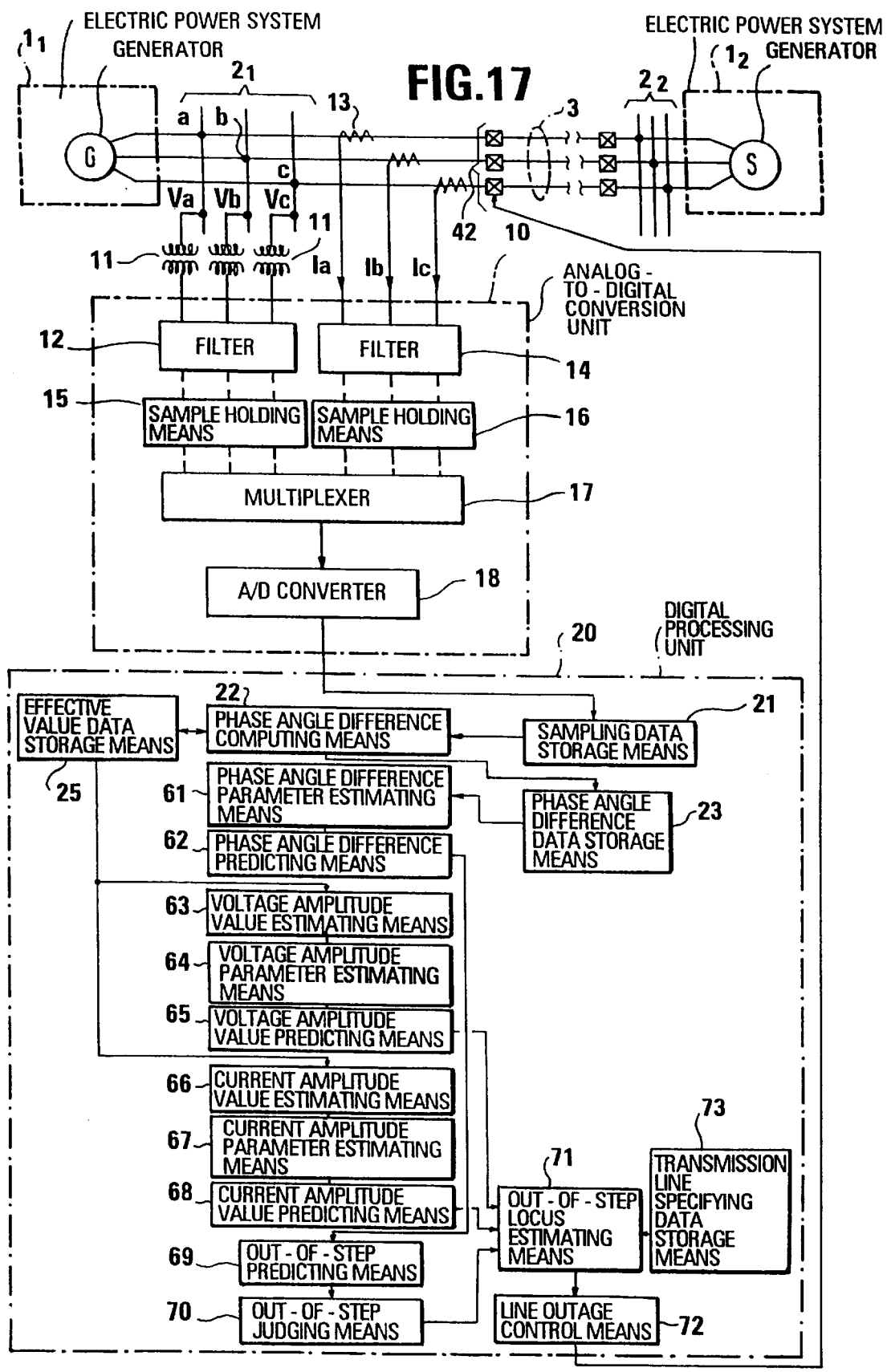

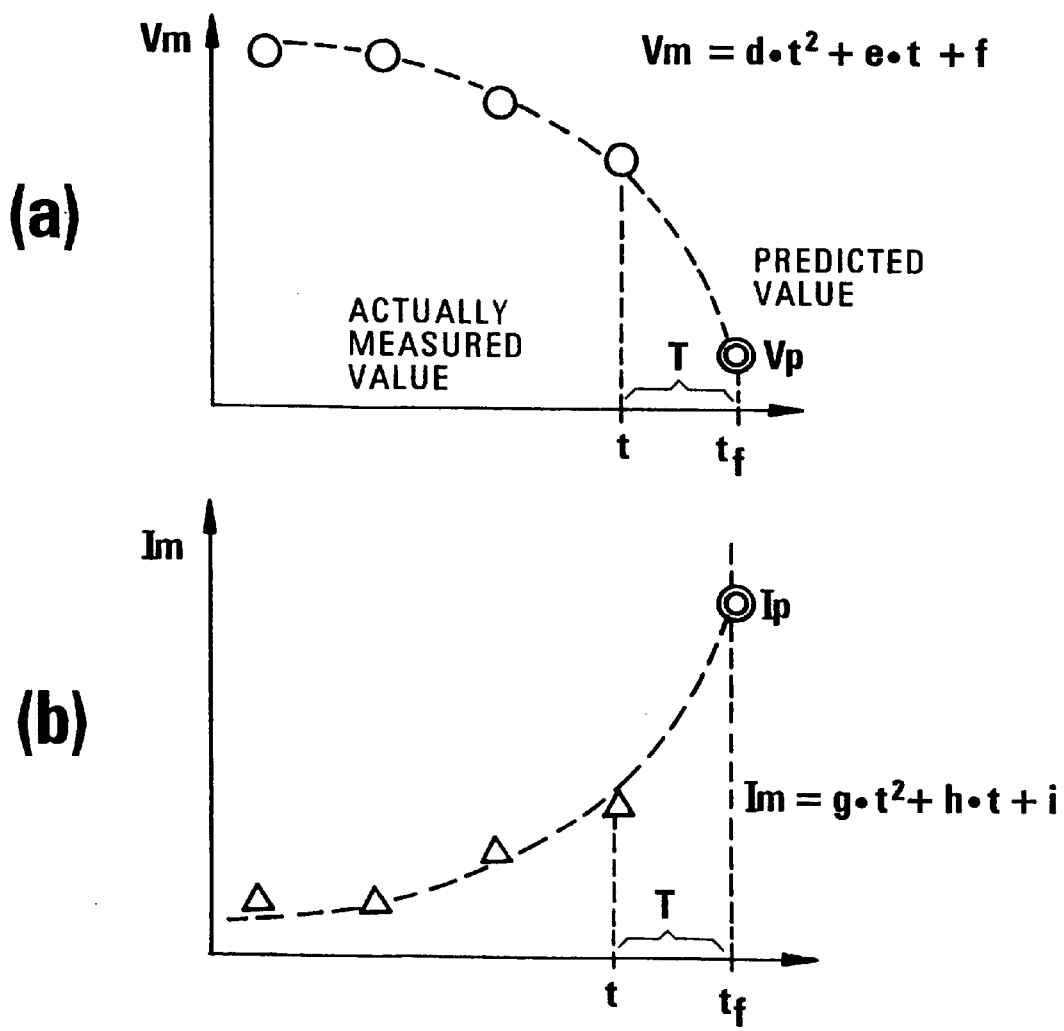

FIG.21 (PRIOR ART)
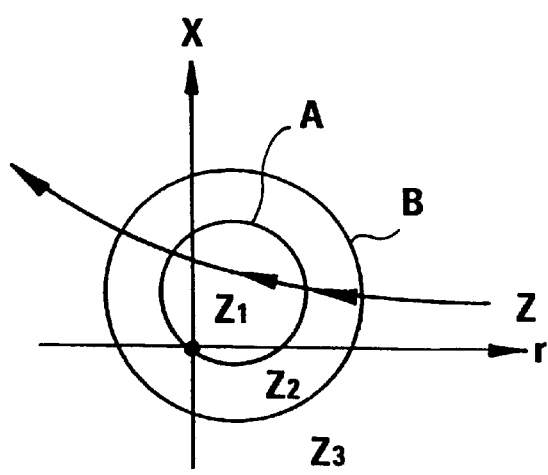
(a)
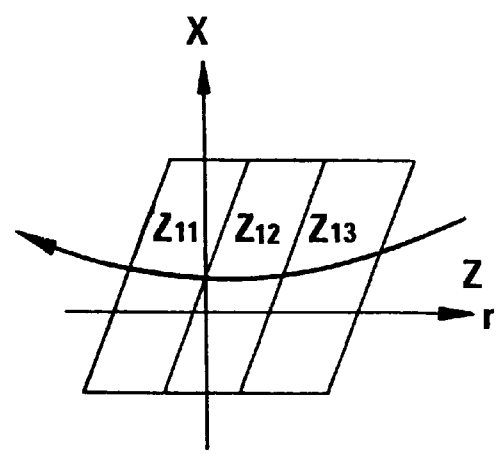
(b)

METHOD AND APPARATUS FOR DETECTING OUT-OF-STEP IN ELECTRIC POWER SYSTEM

BACKGROUND OF THE INVENTION

1. Field of the Invention

This invention relates to a method and an apparatus for detecting an out-of-step in an electric power system, and more particularly to a method and an apparatus for detecting an out-of-step occurred between generator groups installed at both sides of an interconnecting line in an electric power system. This invention also relates to a method and an apparatus for predicting an out-of-step in an electric power system.

2. Description of the Related Art

When detecting the out-of-step occurred between generator groups installed at both sides of a transmission line in an electric power system, an out-of-step detecting apparatus 101 shown in FIG. 20 is provided. In this FIG. 20, G denotes a generator, BUS is a bus, TL is a transmission line, TR is a transformer, L is a load, 102 is a current transformer and 103 is a voltage transformer.

By the way, when detecting the out-of-step using the out-of-step detecting apparatus 101 as described above, several out-of-step detecting methods are known. One of them is a method to detect the out-of-step by using change in impedance of the electric power system detected by the out-of-step detecting apparatus 101 installed at a terminal of a transmission line. The other one is a method to detect the out-of-step from a phase difference of voltages at both ends of a transmission line. Hereinafter, each of these out-of-step detecting methods will be described.

(1) A method to detect the out-of-step from change in impedance.

This out-of-step detecting method is available in two systems: a double circles system (refer to FIG. 21(a)) and a three-zones system (refer to FIG. 21 (b)).

The double circles system is a method to detect the out-of-step from an impedance characteristic of a relay that is installed in the out-of-step detecting apparatus 101 at the terminal of the transmission line TL as shown in FIG. 20. Concretely, in FIG. 21(a), by dividing the impedance viewed by the relay at the earthing point into circles A and B, and three impedance zones Z1, Z2 and Z3 are set in advance. The zone Z1 is the inside of the circle A and is for the impedance viewed by the relay when the system becomes faulty. The zone Z2 is for the impedance present between the circles A and B. The zone Z3 is the outside of the circle B and is for the impedance viewed by the relay in the normal operation of the system.

Generally, the impedance Z viewed by the relay shifts from the zone Z3 to the zone Z2 and to the zone Z1 while changing relatively slowly when the electric power system is out-of-step. The double circles system judges that the electric power system is out-of-step when the impedance shifts to the zone Z1 after stayed in the zone Z2 exceeding a specified time.

In the three zones system, in FIG. 21(b), three zones; Z11, Z12 and Z13 are set in advance in the same manner as in the double circles system. The impedance Z viewed by the relay in this state shifts from the zone Z13 to the zone Z12 and to the zone Z11 while changing relatively slowly. The three zones system judges that the electric power system is out-of-step if the impedance Z shifts to the zone Z12 after stayed in the zone Z13 exceeding a specified time.

(2) A method to detect the out-of-step from a phase difference between voltages at both ends of a transmission line.

In this out-of-step detecting method, two voltage detecting means are provided to detect respective voltages at both ends of the transmission line TL. By exchanging these detected voltages through such a transmission means as a microwave circuit, it is judged that the electric power system is out-of-step if a phase angle difference between voltages at both ends exceeds 180°.

The method to detect the out-of-step from change in impedance described above is to detect the out-of-step from a time of the impedance to pass through the zones. But, as the impedance passes through the zones while slowly changing, how to determine zone widths is extremely difficult. In other words, there is a problem that the out-of-step is judged or not judged depending on the determined zone widths, and the detection of the out-of-step is not reliable. Further, although a time of the impedance Z to pass through each zone is predetermined, if in a particular case, the impedance Z changes at a faster speed than this predetermined time, such an out-of-step cannot be detected.

On the other hand, in the method to detect the out-of-step from a phase difference between voltages at both ends of a transmission line, voltages at both ends of the transmission line are transmitted using such a transmission means as a microwave circuit. As a result, there are such problems that cost increase is inevitable and it is difficult to find a point of a transmission line to occur an out-of-step locus where voltage becomes zero.

SUMMARY OF THE INVENTION

Accordingly, one object of this invention is to provide a method and an apparatus capable of detecting an out-of-step at high accuracy and without predetermining various impedance zones in an electric power system in which two power systems are connected at both sides of a transmission line.

Another object of this invention is to provide a method and an apparatus capable of detecting an out-of-step at high accuracy and a low cost without using special transmission means in an electric power system in which two power systems are connected at both sides of a transmission line.

A further object of this invention is to provide a method and an apparatus capable of predicting an out-of-step in the future and preventing the extension of loss of synchronism to the other generators in advance in an electric power system in which two power systems are connected at both sides of a transmission line.

These and other objects of this invention can be achieved by providing a method for detecting an out-of-step in an electric power system in which two power systems are connected at both sides of a transmission line. The method includes the steps of, a voltage and current taking step for taking in a voltage and a current of the electric power system at regular intervals, a phase angle difference computing step for computing a phase angle difference between the voltage and the current taken by the voltage and current taking step, and an out-of-step judging step for receiving the phase angle difference, for obtaining a change amount in the phase angle differences at every measuring interval and for judging that an out-of-step occurs between the two power systems in the electric power system when the change amount in the phase angle differences is below a predetermined threshold value for detecting sudden change in phase angle and the phase angle difference is above a preset out-of-step judging phase angle difference.

According to one aspect of this invention there is provided an apparatus for detecting an out-of-step in an electric power system in which two power systems are connected at both sides of a transmission line. The apparatus includes, a voltage and current taking means for taking in a voltage and a current of the electric power system at regular intervals, a phase angle difference computing means for computing a phase angle difference between the voltage and the current taken by the voltage and current taking means, and an out-of-step judging means connected to receive the phase angle difference for obtaining a change amount in the phase angle differences at every measuring interval and for judging that an out-of-step occurs between the two power systems in the electric power system when the change amount in the phase angle differences is below a predetermined threshold value for detecting sudden change in phase angle and the phase angle difference is above a preset out-of-step judging phase angle difference.

According to another aspect of this invention there is provided an apparatus for detecting an out-of-step in an electric power system in which two power systems are connected at both sides of a transmission line. The apparatus includes, a voltage and current taking means for taking in voltages and currents in all phases of the electric power system at regular intervals, an electric power processing means for computing active powers in all phases using the voltages and the currents in all phases of the electric power system and for computing a total active power by adding the active powers in all phases, and an out-of-step judging means connected to receive the total active power from the electric power processing means and one of the currents in all phases from the voltage and current taking means for judging that an out-of-step occurs between the two power systems in the electric power system when the one of the currents changes from an increasing trend to a decreasing trend and a polarity of the total active power is reversed.

According to still another aspect of this invention there is provided a method for predicting an out-of-step in an electric power system in which two power systems are connected at both sides of a transmission line. The method includes the steps of, a voltage and current taking step for taking in a voltage and a current of the electric power system at regular intervals, a phase angle difference computing step for computing a phase angle difference between the voltage and the current taken by the voltage and current taking step, a parameter estimating step for estimating parameters in a predicting equation for predicting a phase angle difference in future using a plurality of the phase angle differences computed by the phase angle difference computing step, a phase angle difference predicting step for predicting a future phase angle difference in a future time using the predicting equation obtained by using the parameters estimated by the parameter estimating step, and an out-of-step predicting step for receiving the future phase angle difference and for predicting a future predicted out-of-step time when the future phase angle difference predicted by the phase angle difference predicting step reaches a preset out-of-step judging phase angle difference.

According to a further aspect of this invention there is provided an apparatus for predicting an out-of-step in an electric power system in which two power systems are connected at both sides of a transmission line. The apparatus includes, a voltage and current taking means for taking in a voltage and a current of the electric power system at regular intervals, a phase angle difference computing means for computing a phase angle difference between the voltage and the current taken by the voltage and current taking means, a parameter estimating means for estimating parameters in a predicting equation for predicting a phase angle difference in future using a plurality of the phase angle differences computed by the phase angle difference computing means, a phase angle difference predicting means for predicting a future phase angle difference in a future time using the predicting equation obtained by using the parameters estimated by the parameter estimating means, and an out-of-step predicting means connected to receive the future phase angle difference for predicting a future predicted out-of-step time when the future phase angle difference predicted by the phase angle difference predicting means reaches a preset out-of-step judging phase angle difference.

According to still another aspect of this invention there is provided an apparatus for detecting an out-of-step in an electric power system in which two power systems are connected at both sides of a transmission line. The apparatus includes, a voltage and current taking means for taking in voltages and currents in all phases of the electric power system at regular intervals, a positive phase component conversion means for converting the voltages and the currents in all phases of the electric power system taken in the voltage and current taking means into a positive phase voltage and a positive phase current, a phase angle difference computing means for computing a phase angle difference between the positive phase voltage and the positive phase current, an out-of-step judging means connected to receive the phase angle difference for obtaining a change amount in the phase angle differences at every measuring interval and for judging that an out-of-step occurs between the two power systems in the electric power system when the change amount in the phase angle differences is below a predetermined threshold value for detecting sudden change in phase angle and the phase angle difference is above a preset out-of-step judging phase angle difference, an impedance computing means for computing an impedance to a point where the voltage on the transmission line becomes zero using the positive phase voltage and the positive phase current at a time when the out-of-step in the electric power system is judged, so as to obtain an out-of-step locus of the electric power system, and an out-of-step transmission line specifying means for computing a distance using the impedance computed by the impedance computing means and an impedance per unit length of the transmission line and for specifying the transmission line which includes the out-of-step locus based on the distance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a diagram for explaining the judgement of the presence of the out-of-step from a phase angle difference and a change amount in the phase angle differences;

FIG. 5 is a diagram for explaining the relation of vectors of internal voltages of the generators, bus voltage and transmission current when considering the resistance of the transmission line;

FIG. 7 is a diagram for explaining the impedance computed for finding out a point (the out-of-step locus) where the voltage becomes zero when judged as the out-of-step;

FIG. 17 is a block diagram showing a ninth embodiment of an electric power system out-of-step predicting apparatus of this invention claimed in claim 11;

FIG. 18 is a diagram for explaining to predict the out-of-step at a point of time in the future from the voltage and current at plural points of time;

FIG. 19 is a diagram for explaining to predict the reactance from the predicted voltage and current in the future;

FIG. 21 is a diagram for explaining conventional out-of-step detecting methods.

DETAILED DESCRIPTION OF THE PREFERRED EMBODIMENTS

Figure 1:
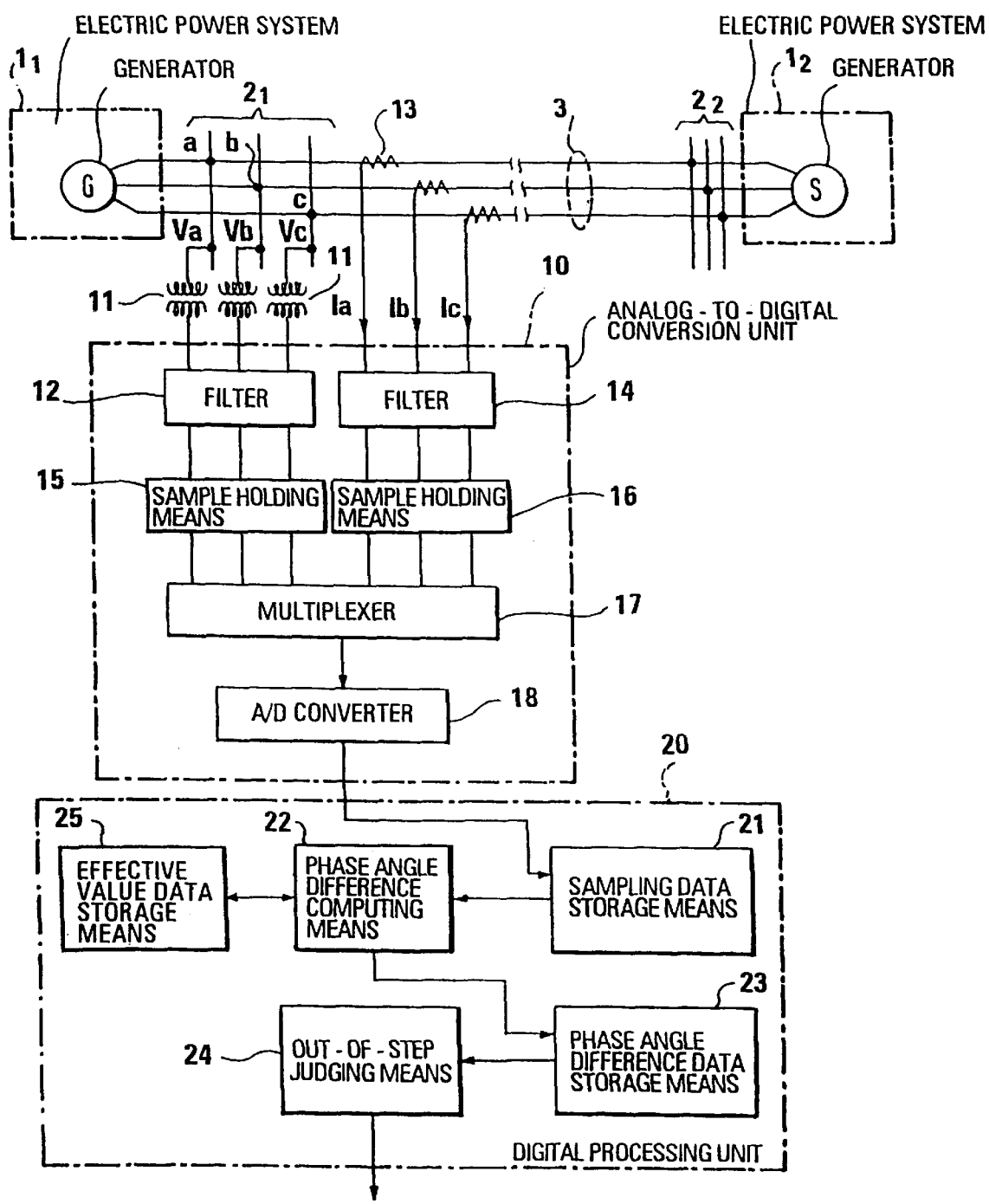
FIG. 1 is a block diagram showing a first embodiment of an electric power system out-of-step detecting method and an electric power system out-of-step detecting apparatus of this invention claimed in claims 1 through 3.

Referring now to the drawings, wherein like reference numerals designate identical or corresponding parts throughout the several views, the embodiments of this invention will be described below.

Figure 20:
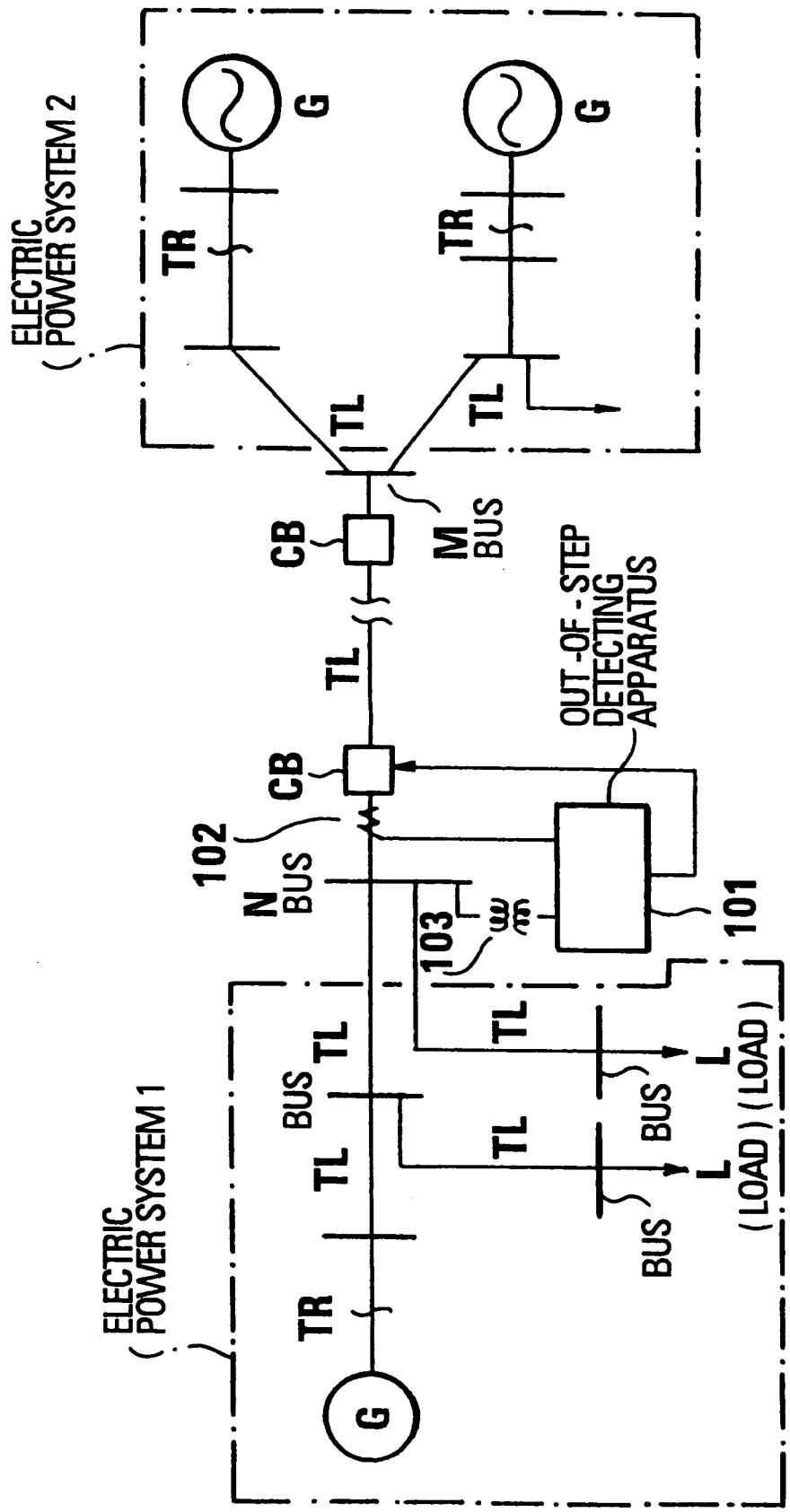
FIG. 20 is a block diagram showing the relation between an electric power system and a conventional out-of-step detecting apparatus.

FIG. 1 is a block diagram illustrating a first embodiment of an electric power system out-of-step detecting method and an electric power system out-of-step detecting apparatus of the invention claimed in claims 1 through 3. The electric power system illustrated in this figure shows the out-of-step detecting portion near an optional transmission line in detail in the electric power systems shown in FIG. 20, and other portions are shown in simplified state. That is, in the electric power system, the state of two electric power systems $1_1$, $1_2$ connected by a transmission line 3 is shown, and $2_1$ and $2_2$ are buses, respectively. Symbols a, b, c assigned to the transmission line 3 represent phase names. In other words, a, b and c denote a-phase, b-phase and c-phase, respectively. Further, the out-of-step is detected by measuring voltages Va, Vb and Vc and currents Ia, Ib and Ic, respectively from the three-phase bus $2_1$ and the three-phase transmission line 3. Hereinafter, for convenience of the explanation, one phase only will be explained. Furthermore, in the electric power systems $1_1$ and $1_2$, a plurality of generators are usually installed. But it is shown that in the electric power systems $1_1$ and $1_2$, only one generator G and only one generator S are respectively installed in FIG. 1.

Here, the out-of-step detecting apparatus of this embodiment is composed of an analog-to-digital conversion unit 10 which is a voltage and current taking means to take in voltage from the bus $2_1$ and current from the transmission line 3 and a digital processing unit 20.

The analog-to-digital conversion unit 10 is composed of a filter 12 which outputs a fundamental component (e.g., 50 Hz) that is of the same frequency component as the power system frequency of a voltage taken from the bus $2_1$ via a voltage transformer 11 by removing noise component of the voltage, and a filter 14 which outputs a fundamental component (e.g., 50 Hz) of a current taken from the transmission line 3 via a current transformer 13, by removing noise component of the current. Further, sample holding means 15, 16 are provided which sample voltage and current of the fundamental component passing through these filters 12, 14, respectively, at the same time at a high speed, at a sampling period of, such as a frequency (600 Hz) that is of 12 times the fundamental wave frequency, and hold the sampling values. There are further provided a multiplexer 17 which sorts the sampled voltages and currents at regular intervals and an A/D converter 18 which converts the outputs of the multiplexer 17 to digital voltages and currents.

On the other hand, the above-mentioned digital processing unit 20 is composed of a sampling data storage means 21 which stores sampled values of digitally converted voltages and currents, and a phase angle difference computing means 22 which takes data from the sampling data storage means 21 at time intervals of, for instance, about 10 ms, computes effective values of a voltage and a current in order and further, computes a phase angle difference based on these effective values of voltage and current. There are further provided an effective value data storage means 25 which stores the effective values of voltages and currents out of the outputs of the phase angle difference computing means 22 one after another, a phase angle difference data storage means 23 which stores the phase angle differences one after another, and an out-of-step judging means 24 which judges the out-of-step using the phase angle difference data stored in the phase angle difference data storage means 23.

Further, although a phase voltage is considered for the voltage that is output from the voltage transformer 11 in case of the neutral earthing or ground earthing, a line-to-line voltage between phases may be output from the voltage transformer 11. In case of line-to-line voltage, it can be treated equally to phase voltage by multiplying the line-to-line voltage by a prescribed coefficient of conversion. The current that is input from current transformer 13 denotes the line current of the transmission line 3.

The sample holding means 15, 16 make the sampling of the voltage and current in analog amount that are output from the filters 12, 14 at, for instance, 600 Hz per second upon receipt of a sampling signal output from an oscillator (not shown), respectively. Therefore, if the sampling is made at 600 Hz, it is possible to take voltage sampled values Vm-3, Vm-2, Vm-1, Vm and current sampled values Im-3, Im-2, Im-1, Im at each 30° into the A/D converter 18 via the multiplexer 17.

Figure 2:
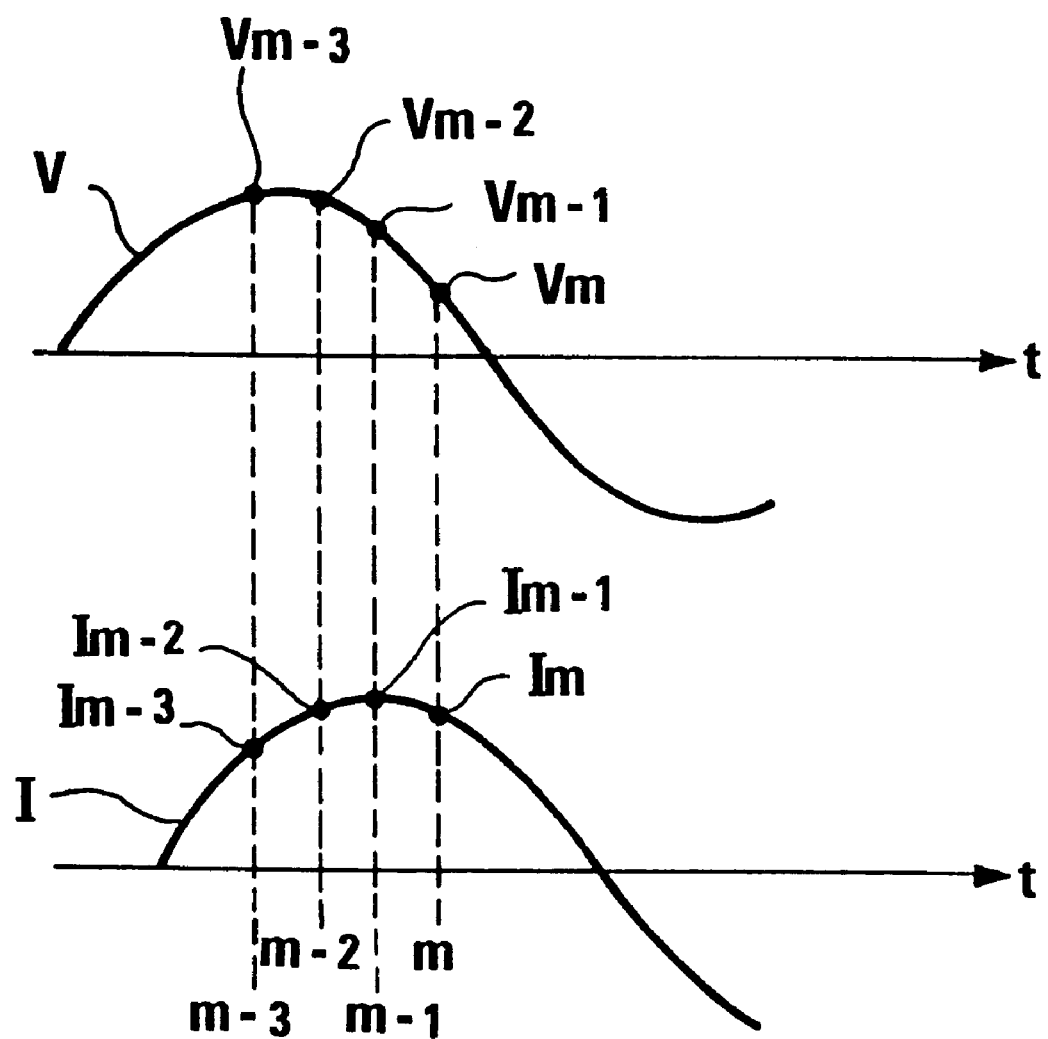
FIG. 2 is a diagram for explaining a sampling period for sampling a voltage of the bus and a current of the transmission line.

Further, in FIG. 2, m, m-1, m-2 and m-3 represent the sampling number of this time, the sampling number of the last time, the sampling number of the before last time, and the sampling number of the third last time, respectively.

The phase angle difference computing means 22 has a voltage and current computing function to obtain an effective value voltage V and an effective value current I using plural voltages, for instance, Vm-3, Vm and plural currents Im-3, Im out of voltage and current data stored in the sampling data storage means 21, respectively. It also has a phase angle difference computing function to obtain an amount of a phase angle difference θ at a time sufficient for the out-of-step judgment, for instance at every time equivalent to 10–20 ms, from above effective value voltage V and effective value current I.

In the out-of-step judging means 24, a threshold value ϵ for detecting sudden change in phase angle is predetermined for a change amount Δθ in the phase angle differences θ at every measuring interval, and an out-of-step judging phase angle difference θc (hereinafter referred to simply as "criterion θc") is set for the phase angle difference θ. When the change amount Δθ obtained in order is smaller than the threshold value ϵ for detecting sudden change in phase angle, the out-of-step judging means 24 judges whether the out-of-step occurs by comparing the phase angle difference θ with the criterion θc.

Next, the operation of the out-of-step detecting apparatus constructed as described above will be explained.

The filter 12 takes the voltage obtained from the bus $1_1$ via the transformer 11, and after removing a harmonic component therefrom, sends a fundamental component of the voltage to the sample holding means 15. Similarly l, the filter 14 takes the current obtained from the transmission line 3 via the current transformer 13, and after removing a harmonic component therefrom, sends a fundamental component of the current to the sample holding means 16.

These sample holding means 15, 16 receive the sampling signal from the oscillator (not shown) and sample voltages and currents at the same time at, for instance, 600 Hz, and then sort the sampled values at regular intervals by the multiplexer 17 and send them to the A/D converter 18, respectively. This A/D converter 18 converts sequentially input sampled values (analog amounts) of voltages and currents into digital voltages . . . Vm-3, Vm-2, Vm-1, Vm and digital currents . . . Im-3, Im-2, Im-1, Im, and stores them in the sampling data storage means 21.

Here, the phase angle difference computing means 22 takes out, for instance, the voltages Vm-3, Vm and the currents Im-3, Im of the third last time and this time from the sampling data storage means 21, and computes the effective value voltage V and the effective value current I according to the following equations. That is, using the following computing equations, compute the effective value voltage V and the effective value current I and stores them in the effective value data storage means 25:

$$2 \cdot V^2 = Vm^2 + (Vm\text{-}3)^2 \quad (1)$$

$$2 \cdot I^2 = Im^2 + (Im\text{-}3)^2 \quad (2)$$

Thereafter, the phase angle difference computing means 22 computes the phase angle difference θ using the effective value voltage V and the effective value current I stored in the effective value data storage means 25. Assuming this phase angle difference is θ, it is possible to obtain phase angle difference θ from the following equation:

$$2 \cdot V \cdot I \cdot \cos(\theta) = Vm \cdot Im + Vm\text{-}3 \cdot Im\text{-}3 \quad (3)$$

That is, the phase angle difference θ is obtained by modifying the equation (3) to the following equation:

$$\theta = \arccos\{(Vm \cdot Im + Vm\text{-}3 \cdot Im\text{-}3)/2 \cdot V \cdot I\} \quad (4)$$

The phase angle differences θ sequentially computed as described above are stored at regular intervals in the phase angle difference data storage means 23.

Here, the judgment on the presence of out-of-step will be explained in detail by taking data of phase angle differences θ in the out-of step judging means 24 from the phase angle difference data storage means 23.

When a fault occurs in transmission lines or a reactor load is charged, a phase difference between voltage and current suddenly changes instantaneously to a value near 90° in an electric power system and therefore, it may not be able to distinguish this sudden change in the phase difference from the out-of-step occurred between generator groups located at both sides of the transmission line.

However, in case of an out-of-step occurred between generator groups located at both sides of the transmission line, a phase angle difference between voltage and current changes not suddenly but changes continuously. Accordingly, the out-of-step judging means 24 judges only an out-of-step occurred between generator groups as shown below using this nature.

First, shown below are conditions for judging that the change amount Δθ in the phase angle differences θ at a measuring point is below the threshold value ϵ for detecting sudden change in phase angle, and the change Δθ does not occur by the fault or connection of reactor load.

As shown in FIG. 3(a), the phase angle difference θ between voltage and current is expanded with the expansion of a phase angle between the generators. If a change amount in the phase angle difference values between voltages and current measured at a fixed period is Δθ, it changes as shown in FIG. 3(b). So, the out-of-step judging means 24 judges that the electric power system is in the state of out-of-step if the phase angle difference θ exceeds the criterion θc when the change amount Δθ does not change suddenly and is below the threshold value ϵ for detecting sudden change in phase angle.

Here, the processing steps will be explained according to FIG. 3(c).

Now, assuming that a phase angle difference at times T−1 and T are $\theta_{T-1}$ and $\theta_T$, a change amount $\Delta\theta_T$ in the phase angle differences between times T−1 and T is computed by the following equation (S1):

$$\Delta\theta_T = \theta_T - \theta_{T-1} \quad (5)$$

The conditions for distinguishing a change in the out-of-step from a change during a fault are that the following assumptions hold good when the threshold value for detecting sudden change in phase angle is predetermined to be ϵ:

An absolute value of $\Delta\theta_{T-n} < \epsilon$ (6)

An absolute value of $\Delta\theta_{T-1} < \epsilon$ (7)

An absolute value of $\Delta\theta_T < \epsilon$ (8)

wherein, n is the designated number of judgments. (S2)

If the above equations do not hold good, changes are regarded to be those in phase angle difference by the fault, etc.

Further, it is considered that an interval between, for example, times T and T−1 is about 1 Hz–0.5 Hz and the number of judgments n is about 3–10.

Next, conditions for judging the out-of-step that the phase angle difference θ between voltage and current exceeds the criterion θc are shown.

When the phase angle difference θ changes as shown below under Conditions 1 and 2, it is judged that the out-of-step occurs between times T−1 and T (S3):

Condition 1: At time $T-1$: $\theta_{T-1} < \theta c$ (9)

Condition 2: At time $T$: $\theta_T < \theta c$ (10)

Here, if the resistance of a transmission line is as small as it can be disregarded, the criterion θc is about 90°, and in case of, for instance, a 500 KV transmission line, a proper value is in the range of 85°–90° when the resistance of a transmission line is very small compared with the reactance thereof.

Next, the relation of vectors of voltage and current before and after the out-of-step will be explained.

To make the explanation simple, a two-generator system composed of generators G and S is used as shown in FIG. 4(a). Here, when assuming that inner voltages of the generators G and S are $E_G$ and $E_S$, respectively, voltage of a bus N is V and current of a transmission line TL is I, the relations of vectors of voltage and current shown in FIG. 4(b)–(d) hold good.

(1) Regarding the relation of vectors of voltage and current before the out-of-step:

At the time before becoming the out-of-step in either the steady state or the transient state after disturbance, a phase angle difference between the inner voltages $E_G$, $E_S$ in both generators G, S is less than 180° as shown in FIG. 4(b). Further, a resistance value r of the transmission line TL is generally extremely smaller than a reactance value X thereof and therefore, the resistance is disregarded here. In this case, current I and voltage ($E_G$−$E_S$) between the generators G, S are almost orthogonal each other, and further, the phase angle difference θ between the voltage V and current I is less than 90°.

(2) Regarding the relation of vectors of voltage and current at the out-of-step:

Further, as shown in FIG. 4(c), when the phase angle difference between voltages $E_G$, $E_S$ of both generators G, S is expanded to 180° and the electric power system is in the out-of-step, the bus voltage V and the transmission line current I become orthogonal each other. That is, the phase angle difference θ between the voltage V and current I becomes 90°.

(3) Regarding the relation of vectors of voltage and current after the out-of-step:

Further, as shown in FIG. 4(d), if the phase angle difference between voltages $E_G$, $E_S$ of both generators G, S exceeds 180°, the phase angle difference θ between the voltage V and current I becomes above 90° and the out-of-step results.

Figure 4:
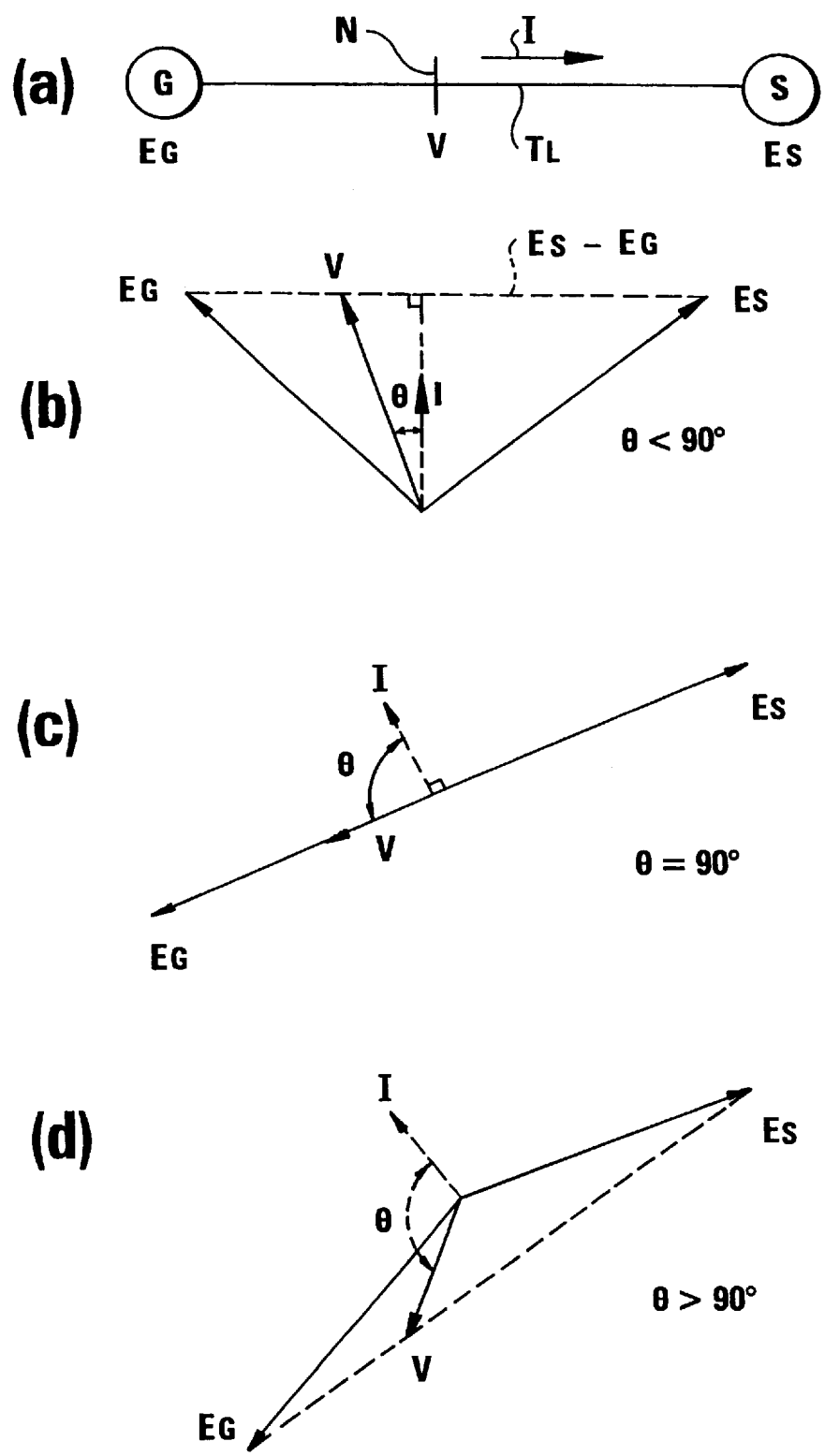
FIG. 4 is a diagram for explaining the relation of vectors of internal voltages of the generators, bus voltage and transmission current before and after the generation of the out-of-step.

For the relations of vectors of voltage and current shown in FIG. 4, voltages $E_G$, $E_S$ of generators G, S are used. But the same relations of vector hold good between the voltage V and current I if the voltage of buses at both ends of the transmission line are used instead of voltages $E_G$, $E_S$ of generators G, S.

Further, the above explanations are made for cases disregarding the resistance. When the resistance of the transmission line is taken into consideration, the relation between voltage and current will become the relation of vectors of voltage and current shown in FIG. 5(a). That is, at the point of time when the phase angle difference between the voltage $E_G$ of the generator G and the voltage $E_S$ of the generator S becomes 180°, a phase angle difference θ between the voltage V of the bus N and the current I of the transmission line TL can be computed from the following equation:

$\tan \theta = X \cdot I/(r \cdot I) = X/r$ (11)

A value θ that can be computed from this computing equation does not agree with 90°. Generally, however, as X>>r, θ is nearly 90°. If, for instance, X/r=20, θ is 87.1°. This value θ exists in the above-mentioned range of, for instance, 85°–90°.

Therefore, according to the embodiment described above, when, for instance, a phase voltage of a bus and a current of line of a transmission line are measured and a phase angle difference θ between the voltage and current is computed from these phase voltage and line current and if a change amount Δθ of this phase angle difference θ at every measuring interval is below a predetermined threshold value ϵ for detecting sudden change in phase angle, and further, the phase angle difference θ becomes larger than a criterion θc, an electric power system is judged to be in the state of out-of-step. And so, it is possible to surely judge the out-of-step between generator groups at both ends of the transmission line including the buses, without predetermining zones or without using a special transmission means for data communication.

Figure 6:
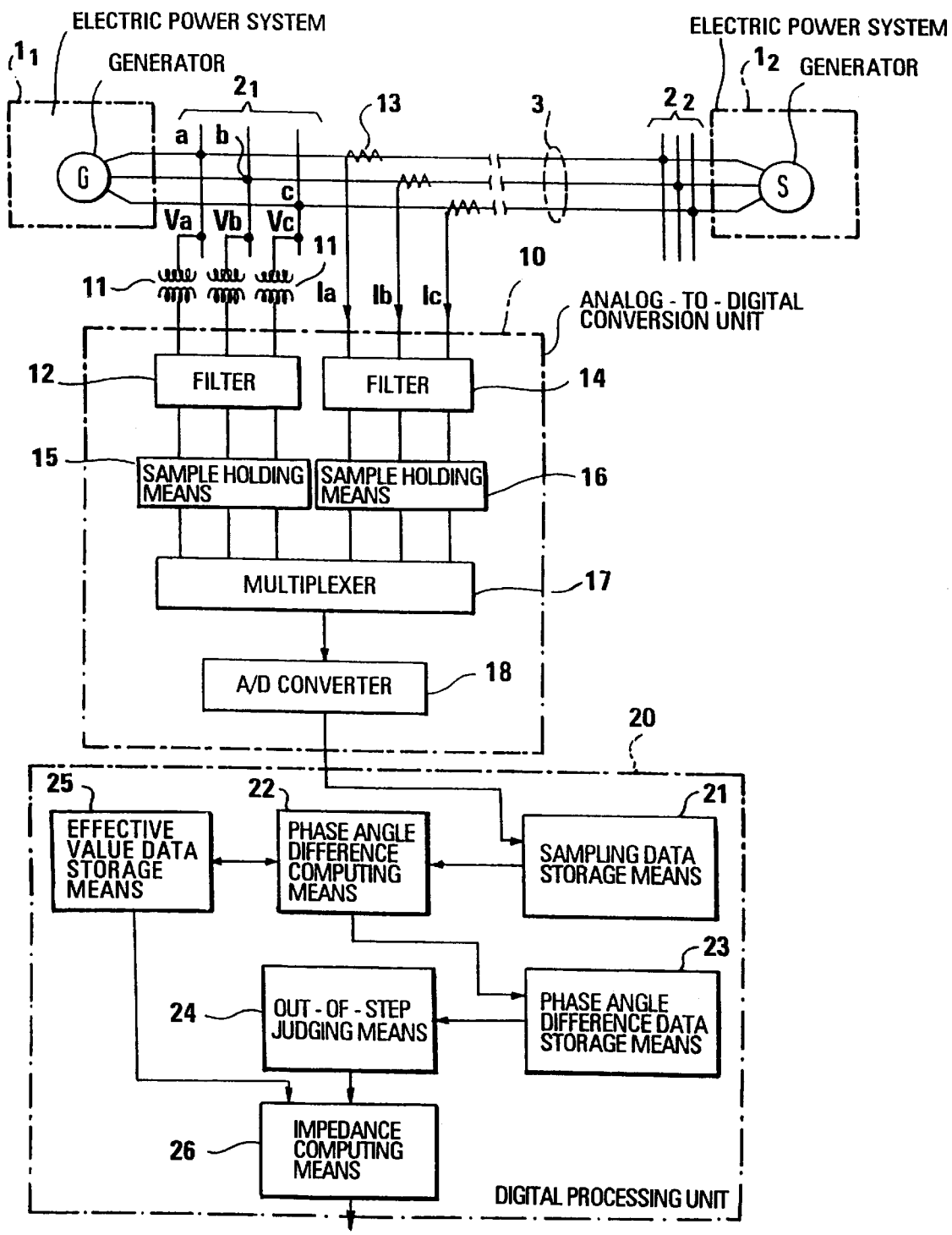
FIG. 6 is a block diagram showing a second embodiment of an electric power system out-of-step detecting method and an electric power system out-of-step detecting apparatus of this invention claimed in claims 4 and 5.

FIG. 6 is a block diagram explaining a second embodiment of an electric power system out-of-step detecting method and an electric power system out-of-step detecting apparatus of the invention claimed in claims 4 and 5. In FIG. 6, the same component elements as those shown in FIG. 1 are assigned with the same reference numerals and their explanations are omitted, and only different portions will be described here.

In the embodiment shown in FIG. 6, an impedance computing means 26 is newly provided to compute an impedance for determining a distance from bus $2_1$ to a point on the transmission line where the voltage V becomes zero, that is, an out-of-step locus, by reading the effective value voltage V and the effective value current I at the point of time when the electric power system is judged to be out-of-step from the effective value data storage means 25, when the electric power system is judged to be out-of-step by the out-of-step judging means 24 in the digital processing unit 20.

Next, before explaining the operation of the out-of-step detecting apparatus according to this embodiment, a reason for computing such impedance will be explained.

In the electric power system, if the phase angle difference θ between voltages at both ends of the transmission line exceeds 180°, a so-called out-of-step locus where the voltage becomes zero at somewhere on the transmission line is produced.

This out-of-step locus will be explained using FIG. 7. FIG. 7(a) is a diagram showing a voltage distribution on the transmission line, and A is a point (an out-of-step locus) where the voltage becomes zero. FIG. 7(b) is a diagram showing the relation of vectors between the voltage and current.

Now, it is assumed that the buses $2_1$ and $2_2$ at both ends of the transmission line 3 are replaced by buses M and N, and voltages of the buses N and M are VN and VM, respectively. Here there exists a point at where the magnitude of voltage becomes zero as shown in FIG. 7(b), when a phase angle difference between the voltages VN and VM becomes 180°. As the value of impedance of the transmission line depends on the length thereof, the present invention makes it possible to find a place of the out-of-step locus where the voltage on the transmission line becomes zero by obtaining a value of impedance from the voltage and current measured at the instant when the phase angle difference between the voltage VN and VM becomes 180°.

In explaining the operation of the out-of-step detecting apparatus according to this embodiment, the operation after the out-of-step is judged by the out-of-step judging means 24 will be explained by omitting the explanation of the operations up to the detection of the out-of-step between generator groups at both ends of a transmission line, as they are the same as those explained in the above embodiment using FIGS. 1 through 5.

Now, when the out-of-step between the generator groups at both ends of the transmission line is judged by the out-of-step judging means 24, a so judged signal is sent to the impedance computing means 26. The relation shown by an equation (12) holds good regarding a point where the out-of-step locus is produced when a phase angle difference between the voltage V and current I is 90° as shown in FIG. 7(b). Therefore, the impedance computing means 26 computes an impedance Z according to an equation (13) shown below:

$$V - I \cdot Z = 0 \quad (12)$$

$$Z = V/I \quad (13)$$

In this equation, when the resistance r of the transmission line is smaller than the reactance X thereof, the impedance Z becomes equal to jX (Z=jX), and the above equation (12) can be expressed by V−jI·X=0. So, it is possible to obtain the reactance X from the following equation:

$$X = V/jI \quad (14)$$

After obtaining the phase angle difference θ between the effective value voltage V and the effective value current I, when this phase angle difference θ shifts from the condition in the equation (9) to the condition in the equation (10), such as when θ becomes 90°, using the voltage V and current I at this time, the impedance Z or the reactance X is obtained according to the equation (13) or (14).

When the impedance Z or the reactance X of the transmission line is computed, it becomes possible to find a point generating an out-of-step locus from the computed impedance Z or reactance X, because the impedance or the reactance per unit length of the transmission line is already known.

Further, it is also possible to use the voltage V and the current I when the phase angle difference θ is not only just 90° but also it is in a range of certain width, for instance, 85°–90° as described above.

So, according to this embodiment as described above, it has the same effect as the embodiment shown in FIG. 1. In addition, it is possible to compute the impedance accurately, when the phase angle difference θ between the voltage V and the current I becomes 90° using the voltage V and current I at this time, and to find a point generating the out-of-step locus where the voltage on the transmission line becomes zero.

Figure 8:
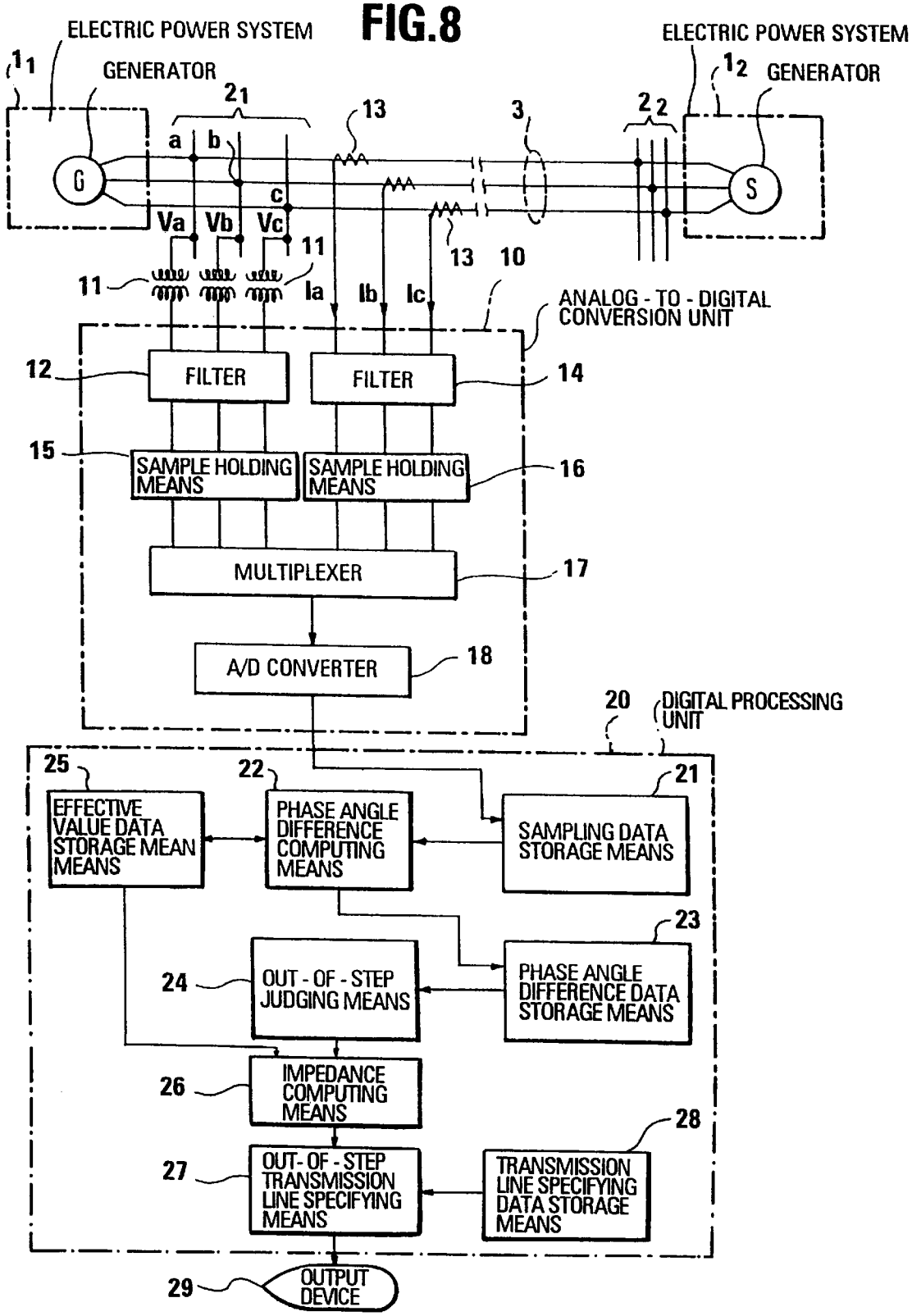
FIG. 8 is a block diagram showing a third embodiment of an electric power system out-of-step detecting apparatus of this invention claimed in claim 6.

FIG. 8 is a block diagram showing a third embodiment of an electric power system out-of-step detecting apparatus of the invention claimed in claim 6.

In this embodiment, an out-of-step transmission line specifying means 27, which specifies a transmission line on which an out-of-step locus is found by computing a distance using the impedance that is computed by the impedance computing means 26 and the impedance per unit distance of the transmission line that is already known, is added to the component elements shown in FIG. 6. Further, a transmission line specifying data storage means 28 is added, which stores data needed for specifying a transmission line, for instance, an impedance value u per unit length of the transmission line, a length L of the transmission line between buses N and M.

Other component elements are entirely the same as those shown in FIG. 6 and therefore, the explanations of the same component elements will be omitted here.

Next, before explaining the operation of the apparatus according to this embodiment, a reason for specifying the transmission line on which an out-of-step locus appears will be explained.

When a phase angle difference of voltages at both ends of the transmission line becomes 180°, a point at where the voltage becomes zero, that is, the out-of-step locus appears somewhere of the transmission line. Shown in FIG. 7(a) is a voltage distribution diagram when the phase angle difference between voltages VN and VM at both ends of the transmission line becomes 180°, and A is the out-of-step locus point where the voltage becomes zero. FIG. 7(b) is a diagram showing the relation of vectors between the voltage and current. Now, when the phase angle difference between the voltages VN and VM the buses N and M at both ends of the transmission line becomes 180°, a point where the magnitude of the voltage becomes zero will appear. For instance, after computing the impedance Z up to the out-of-step locus from voltage VN (VN=V) of the bus N and current I of the transmission line 3 according to the above equation (13), a distance from the bus N to the out-of-step locus can be obtained based on this computed impedance. On the other hand, the length of the transmission line between the buses N and M is known in advance. Accordingly, when the length of this transmission line is compared with a distance obtained from the computed impedance, it is possible to judge if there is an out-of-step locus on the transmission line between the buses N and M.

In explaining the operation of the out-of-step detecting apparatus shown in FIG. 8, the operation up to the detection of the out-of-step between the generator groups at both ends of the transmission line will be omitted, as they are the same as those explained using FIGS. 1 through 5, and the operation after the out-of-step is judged by out-of-step judging means 24 will be described.

Now, when the out-of-step between the generator groups at both ends of the transmission line is judged by the out-of-step judging means 24, a so-judged signal is sent to the impedance computing means 26. The relation shown by the equation (12) holds good regarding the point on the transmission line 3 where the out-of-step locus appears, when a phase angle difference between the voltage V and the current I is 90° as shown in FIG. 7(b). Therefore, this impedance computing means 26 is able to compute the impedance Z from the equation (13).

If the resistance r of the transmission lines is smaller than the reactance X thereof, the impedance Z becomes equal to jZ (Z=jX), and the above equation (12) becomes V−jI·X=0, and it is possible to obtain the reactance X according to the equation (14).

Further, although the phase angle difference is assumed to be 90° in the above, the voltage V and the current I may be used when the phase angle difference is in a specified range, for instance, 85°–90° as described above.

After obtaining the impedance Z or the reactance X as described above, either one of them is sent to the out-of-step transmission line specifying means 27.

Figure 9:
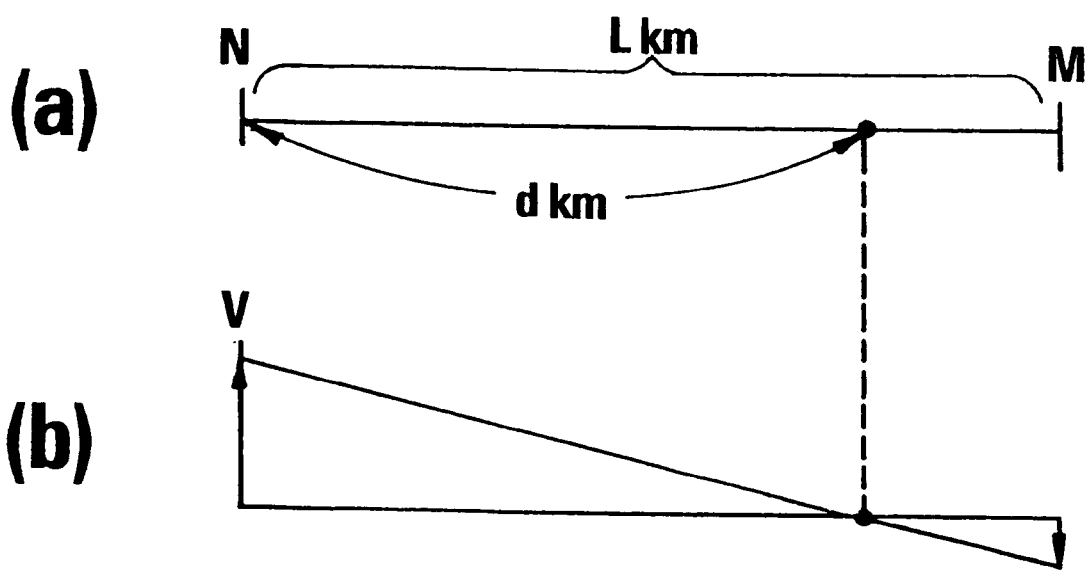
FIG. 9 is a diagram for explaining the relation between the length of the transmission line and a distance obtained from the impedance.

This out-of-step transmission line specifying means 27 specifies whether an out-of-step locus appears at any point of the transmission line on which voltage and current were measured. First, an impedance value u per unit length of the transmission line is memorized in the transmission line specifying data storage means 28. This impedance value u is assumed (r+jx). Using this impedance value u per unit length and the impedance Z computed by the impedance computing means 26, a distance d from the bus N to a point where an out-of-step locus appears as shown in FIG. 9(a) can be computed according to a following equation (15):

$$d=Z/u \qquad (15)$$

So, if disregarding the resistance r of the transmission line, a following equation is obtained:

$$d=X/x \qquad (16)$$

Here, the out-of-step transmission line specifying means 27 reads out the length L of the transmission line between the buses N and M from the transmission line specifying data storage means 28, and compares the length L of this transmission line with the distance d. If the following relation holds good, it indicates that the distance d is within the length L of the transmission line and shows that the out-of-step locus is in the transmission line TL as shown in FIG. 9(b):

$$d \leq L \qquad (17)$$

If, on the contrary, they are in the relation shown below, $$d > L \qquad (18)$$

it is seen that the out-of-step locus exists far away from the transmission line TL.

However, when an effect of error is considered, if they are in the relation as shown below using a coefficient α, the out-of-step locus is judged to exist in the transmission line where voltage and current are measured.

$$d \leq \alpha L, \text{ (e.g., } \alpha=0.95) \qquad (19)$$

This result of judgment is output to such an output device 29 as CRT, printer, etc.

So, according to the embodiment as described above, when the phase angle difference θ between the voltage V and the current I becomes 90°, using the voltage V and current I at this time the impedance up to a specific point (the out-of-step locus) where the voltage on the transmission line becomes zero is computed. Thereafter, a distance up to the out-of-step locus point is obtained from this computed impedance value and the predetermined impedance value per unit length of the transmission line. Then, by comparing this distance with the overall length of the transmission line, it is possible to judge whether the out-of-step locus is in a specific transmission line that is connected to the buses M and N. So, it is possible to specify a specific transmission line generating the out-of-step locus using the voltage V and the current I of the transmission lines including the buses, without necessity for deciding zones as before and without requiring special data communication means as before, and to provide the result to operator by an output device 29.

Figure 10:
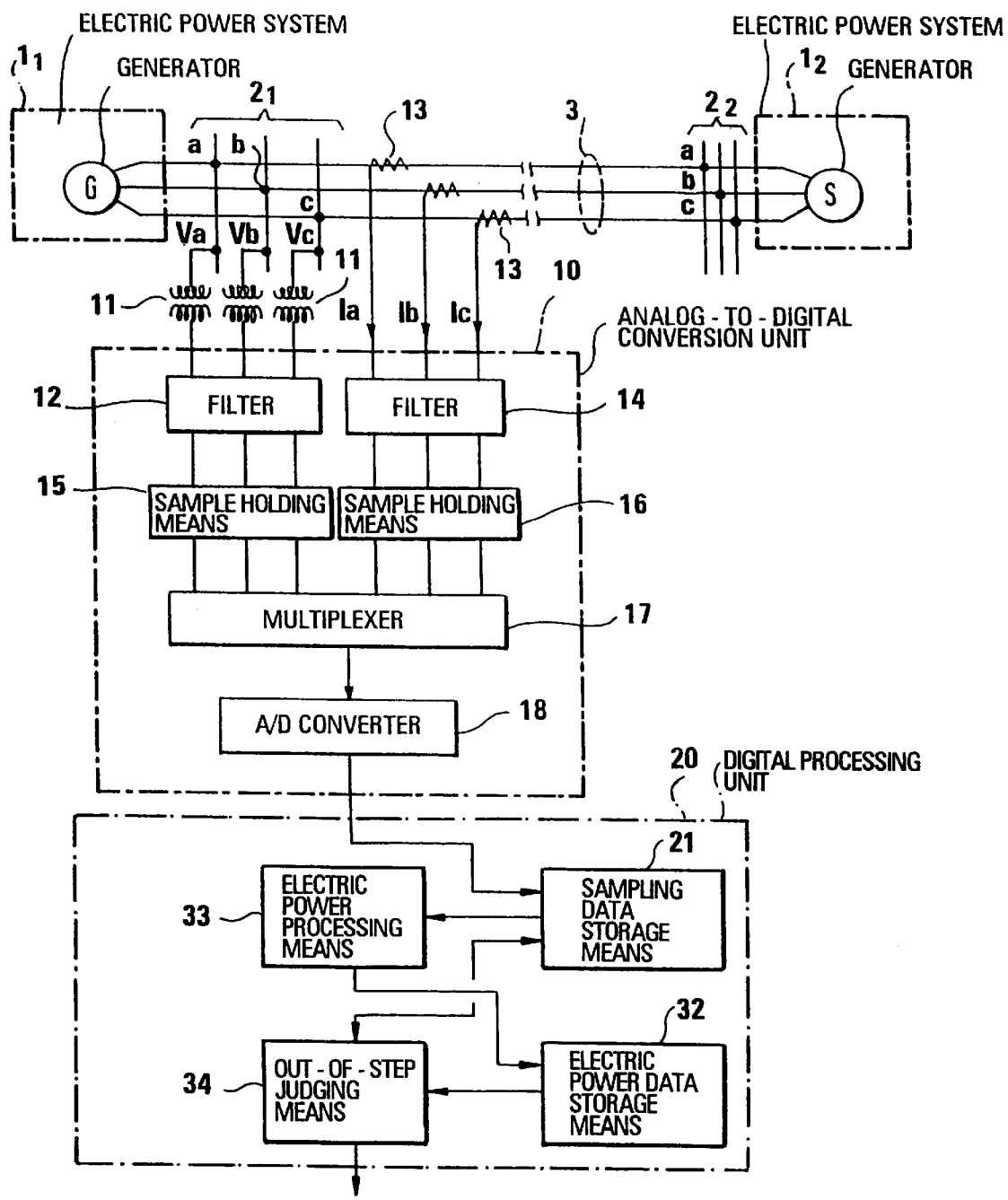
FIG. 10 is a block diagram showing a fourth embodiment of an electric power system out-of-step detecting apparatus of this invention claimed in claim 7.

FIG. 10 is a block diagram for explaining a fourth embodiment of an electric power system out-of-step detecting apparatus of the invention claimed in claim 7.

This out-of-step detecting apparatus is composed of the analog-to-digital conversion unit 10 and the digital processing unit 20.

The analog-to-digital conversion unit 10 is the same as that explained in FIG. 1 and therefore, its explanation will be omitted here. The digital processing unit 20 is provided with the sampling data storage means 21 and an electric power processing means 33, which inputs voltage and current sampled values of each a-, b- and c-phase that are stored in the sampling data storage means 21, that is, voltages Va, Vb, Vc and Ia, Ib, Ic and computes active powers Pa, Pb, Pc of each phase by multiplying these values for each phase, and further, obtains a total active power by adding the active powers Pa, Pb, Pc and stores them in an electric power data storage means 32. There are further provided an out-of-step judging means 34 which judges the out-of-step using this total active power and the currents stored in the sampling data storage means 21.

Next, the operation of the apparatus described above will be explained.

The sample holding means 15 samples and holds the voltages in all phases that are obtained from the bus $2_1$ of all phases via the voltage transformer 11 and sends them to the multiplexer 17. The sample holding means 16 samples and holds the currents that are obtained from the transmission line 3 of all phases via the current transformer 13 and sends them to the multiplexer 17.

This multiplexer 17 takes the sampled voltages and currents in all phases for each specified period and sends them to the A/D converter 18. This A/D converter 18 converts the sampled analog voltages and currents in all phases into digital voltages Va, Vb, Vc and digital currents Ia, Ib, Ic and stores them in the sampling data storage means 21. The operations up to here are the similar to those explained in FIG. 1 and other embodiments.

In this embodiment, the electric power processing means 33 reads out the voltages Va, Vb, Vc and the currents Ia, Ib, Ic in each phase from sampling data storage means 21 and computes active powers Pa, Pb, Pc for each phase according to the equations shown below.

$$Pa = Va \cdot Ia \qquad (20)$$

$$Pb = Vb \cdot Ib \qquad (21)$$

$$Pc = Vc \cdot Ic \qquad (22)$$

When active powers in all phases Pa, Pb, Pc are obtained as described above, a total active power P is computed then by summing up active powers in all phases Pa, Pb, Pc, and stores it in the electric power data storage means 32.

$$P = Pa + Pb + Pc \qquad (23)$$

Thereafter, the out-of-step judging means 34 makes the judgment using the total active power P stored in the electric power data storage means 32 and the current data stored in the sampling data storage means 21.

Figure 11:
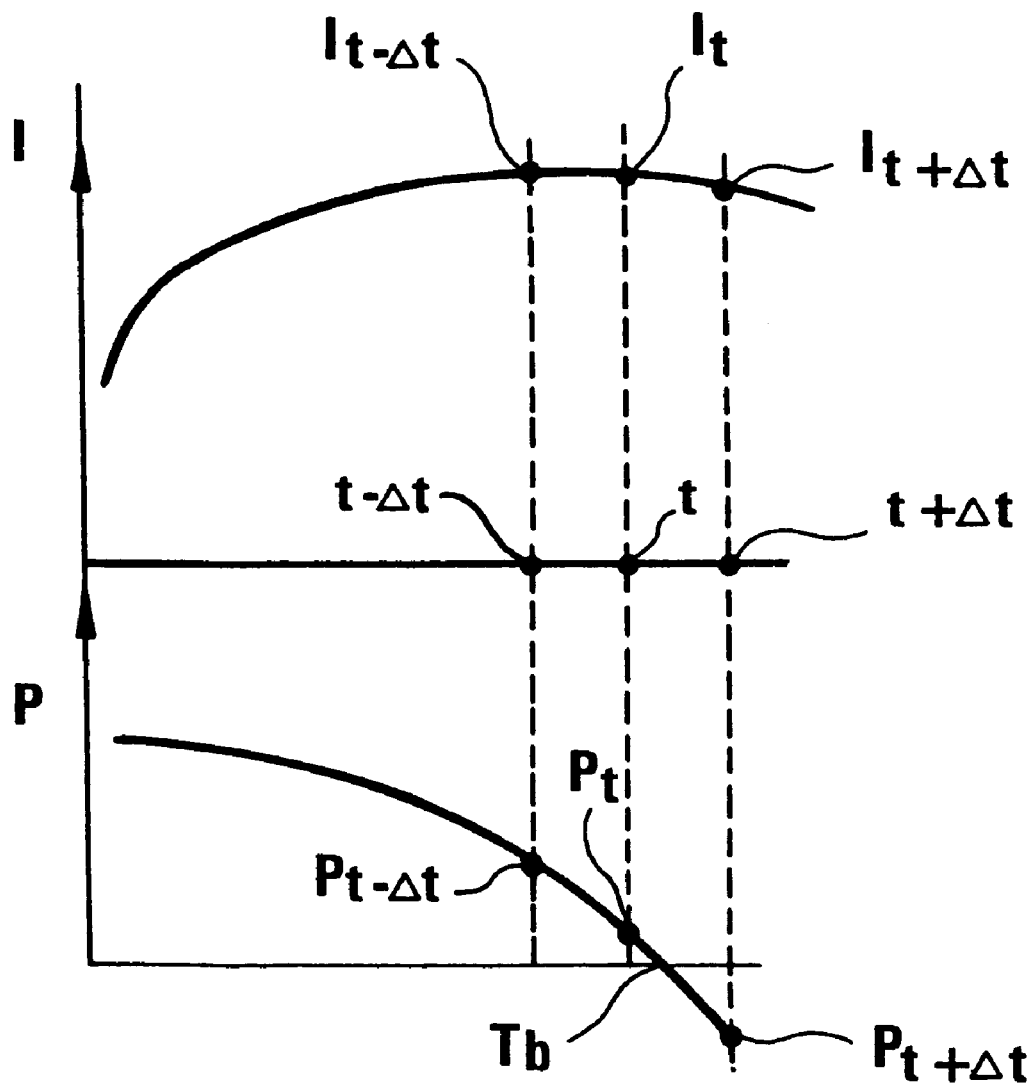
FIG. 11 is a diagram for explaining the relation between current and electric power at the time when the system becomes the out-of-step.

In this out-of-step judgment, by detecting a time point Tb when the current Ia (or Ib, Ic) measured at a specified period changes from the increasing trend to the decreasing trend as shown in FIG. 11, and the polarity of the total active power P is reversed as shown in the same figure, it is judged that the system is in the out-of-step state at this time point Tb.

That is, the out-of-step judging means 34 checks the changing trend of the electric power Pt and the current It that are obtained at every time Δt, and at the point of time when the current changes from the increase trend to the decrease trend and the polarity of the total active power P is reversed, judges that the system is in the out-of-step state. When explaining this using FIG. 11, if the following equations hold good, it is judged that the out-of-step occurs between the time t and the time (t+Δt):

$$I_{t-\Delta t} < I_t, I_t > I_{t+\Delta t} \tag{24}$$

$$P_t P_{t+\Delta t} < 0 \tag{25}$$

So, according to the embodiment described above, the out-of-step is judged by measuring voltages and currents in all phases and when the total active power obtained by adding active powers in all phases becomes zero, and the current changes from the increase trend to the decrease trend. It is therefore possible to judge the out-of-step only by measuring voltages and currents in all phases.

Figure 12:
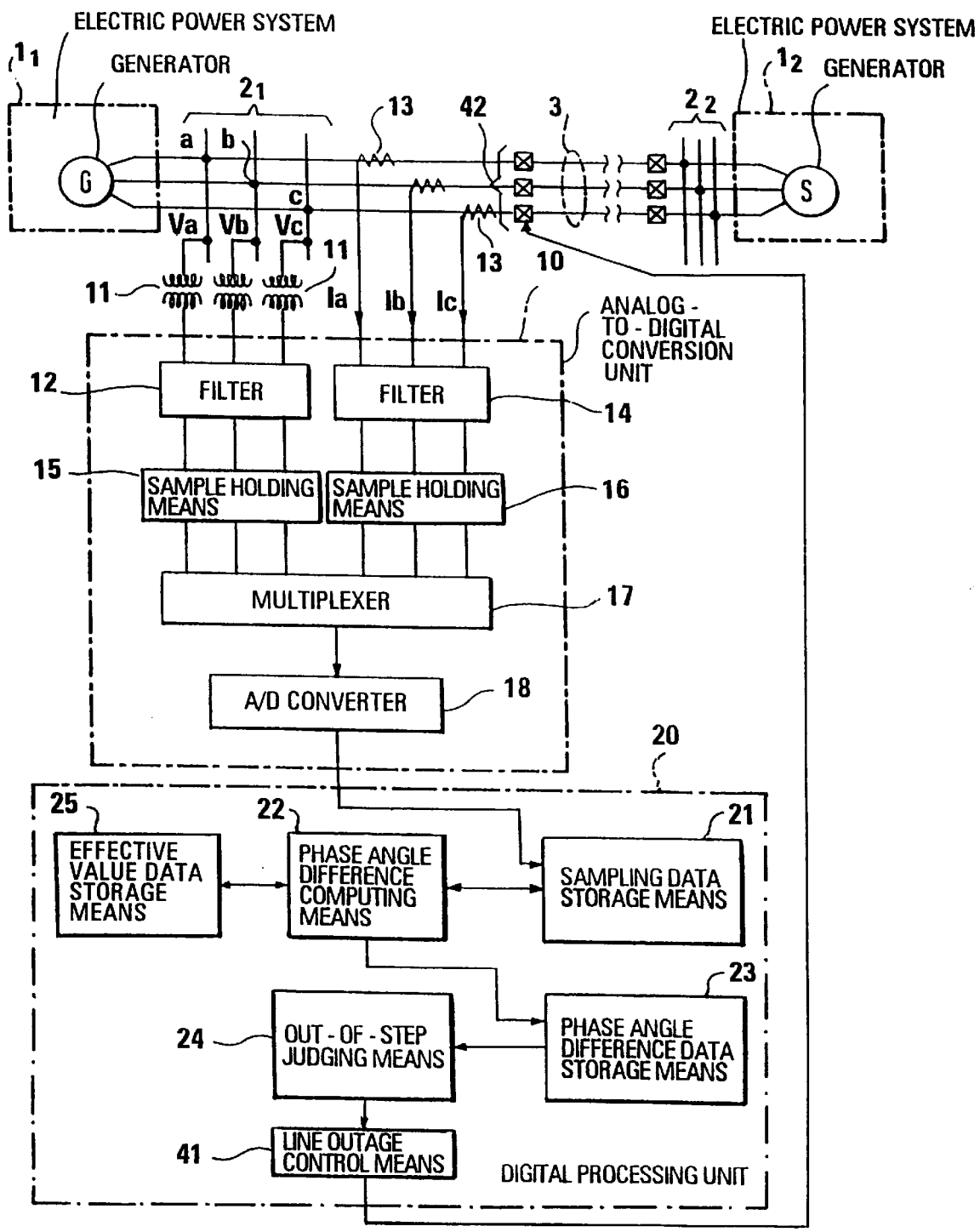
FIG. 12 is a block diagram showing a fifth embodiment of an electric power system out-of-step detecting apparatus.

FIG. 12 is a block diagram for explaining a fifth embodiment of an electric power system out-of-step detecting apparatus.

This electric power system out-of-step detecting apparatus is applicable to all embodiments shown FIGS. 1, 6 and 8, but for convenience, an example applied to FIG. 1 will be explained. Therefore, in FIG. 12, the same component elements as those shown in FIG. 1 are assigned with the same reference numerals and the detailed explanations are omitted, and especially different portions only will be explained.

This out-of-step detecting apparatus is in such structure that the output system of the out-of-step judging means 24 shown in FIG. 1 is added with a line outage control means 41 to open the transmission line including the buses on which voltages and currents were measured when the out-of-step judging means 24 judges that the electric power system is in the out-of-step state.

Next, in explaining the operation of the above apparatus according to this embodiment, the operations up to the detection of the out-of-step occurred between generators at both ends of the transmission line in the analog-to-digital conversion unit 10 and the digital processing unit 20 are the same as those explained using FIGS. 1 through 5. Therefore, their explanations are omitted, and the operations after the out-of-step is judged by the out-of-step judging means 24 will be described.

Now, when the out-of-step between the generators at both ends of the transmission line is judged by the out-of-step judging means 24, the line outage control means 41 opens a circuit breaker 42 that is provided to the transmission line 3 to open the transmission line.

Further, when applying this embodiment to the electric power system out-of-step detecting apparatus shown in FIG. 8, this electric power system out-of-step detecting apparatus will become such structure that the output system of the out-of-step transmission line specifying means 27 is provided with the line outage control means 41 which opens the transmission line including the buses when the out-of-step transmission line specifying means 27 judges the transmission line containing the out-of-step locus.

So, according to the embodiment described above, the transmission line is opened when the electric power system is judged in the out-of-step or the transmission line where the out-of-step is detected is judged. Therefore, it is possible to open the transmission line at a high speed and certainly without setting zones as before and without requiring special transmission means as before when the out-of-step is found.

Figure 13:
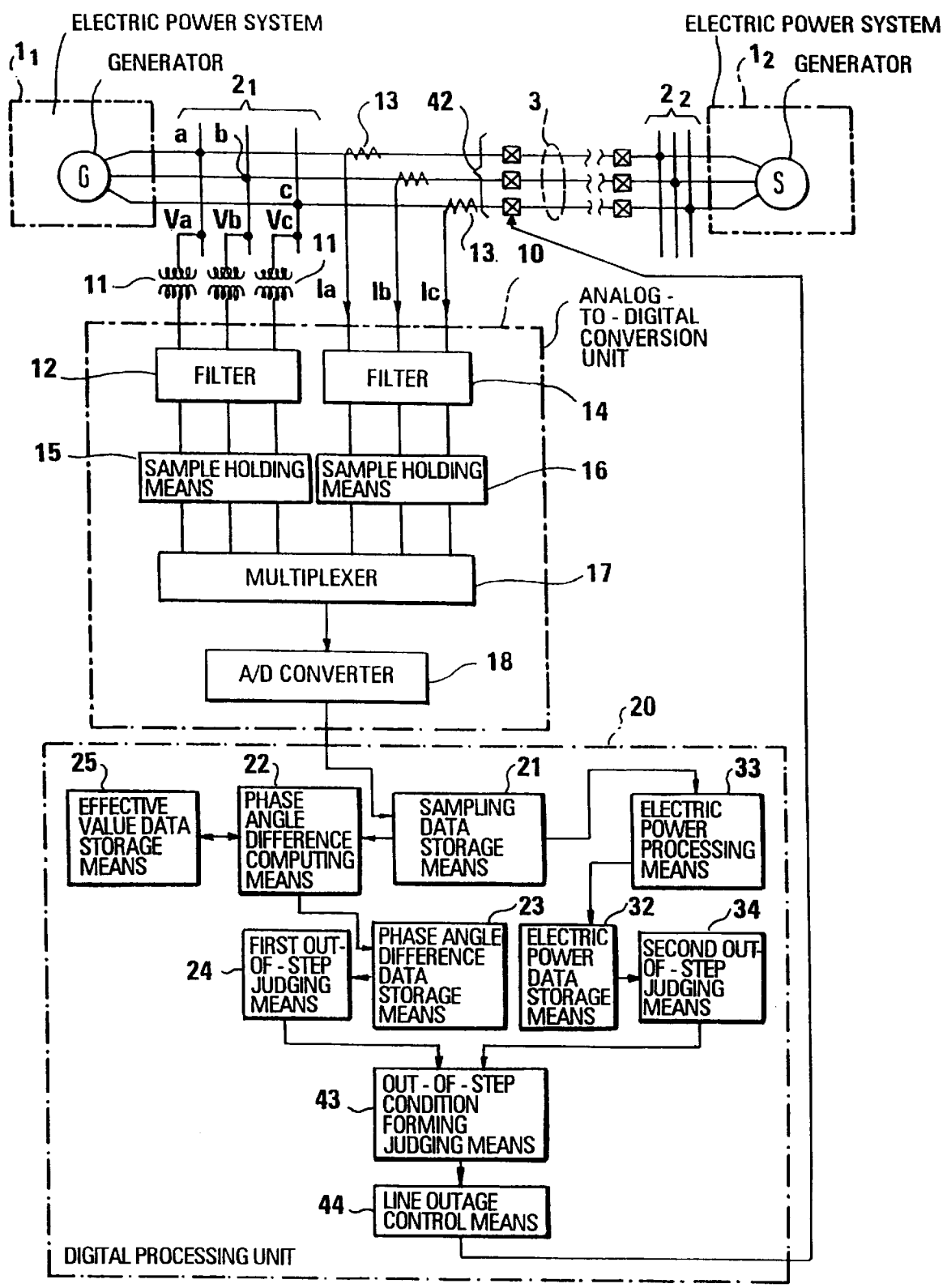
FIG. 13 is a block diagram showing a sixth embodiment of an electric power system out-of-step detecting apparatus.

FIG. 13 is a block diagram for explaining a sixth embodiment of an electric power system out-of-step detecting apparatus.

In this embodiment, the electric power system out-of-step detecting apparatus opens the transmission line when the out-of-steps are found, respectively, by the combined structure of those shown in FIG. 1 or 8 and FIG. 10. So, in FIG. 13, the same component elements as those shown in FIGS. 1 and 10 are assigned with the same reference numerals and their detailed explanations will be omitted.

The analog-to-digital conversion unit 10 of this out-of-step detecting apparatus is provided with the filters 12, 14, the sample holding means 15, 16, the multiplexer 17 and the A/D converter 18.

On the other hand, the digital processing unit 20 of this out-of-step detecting apparatus is provided with the sampling data storage means 21 to store digital voltage and digital current data converted by the A/D converter 18, the phase angle difference computing means 22, the phase angle difference data storage means 23, the first out-of-step judging means 24, and the effective value data storage means 25. In addition, there are provided the electric power data storage means 32, the electric power processing means 33 and the second out-of-step judging means 34.

Further, the digital processing unit 20 is provided with an out-of-step condition forming judging means 43 to judge whether both the first out-of-step judging means 24 and the second out-of-step judging means 34 judge the out-of-step, and a line outage control means 44 to open the transmission line including the buses when the out-of-step condition is recognized by the out-of-step condition forming judging means 43, and to open the circuit breaker 42 of the transmission line.

Next, the operation of such the apparatus will be explained.

Voltage and current data taken by the multiplexer 17 at, for instance, 600 Hz are sent to the A/D converter 18. In this A/D converter 18, sampled analog voltages and currents are converted into digital voltages . . . , Vm-3, Vm-2, Vm-1, Vm and digital currents . . . , Im-3, Im-2, Im-1, Im successively and are stored in the sampling data storage means 21.

Here, the phase angle difference computing means 22 takes out, for instance, the voltages Vm-3, Vm and the currents Im-3, Im of the third last time and this time out of the sampling data storage means 21, and computes the effective value voltage V and the effective value current I according to the equations (1) and (2), and also, computes the phase angle difference θ of the voltage V and the current I according to the equations (3) and (4).

Further, the first out-of-step judging means 24 compares the phase angle difference θ with the preset criterion θc when the change amount Δθ in the phase angle differences during a time equivalent to 10–20 ms is smaller than the threshold value ε for detecting sudden change in phase angle, and if the phase angle difference θ changes from θ<θc to θ>θc, judges the out-of-step.

On the other hand, the electric power processing means 33 reads the voltages Va, Vb, Vc and the currents Ia, Ib, Ic in all phases out of the sampling data storage means 21 and computes active powers Pa, Pb, Pc for all phases according to the equations (20) through (22).

When the active powers Pa, Pb, Pc, in all phases are obtained as described above, a total active power P is computed then by summing up the active powers Pa, Pb, Pc in all phases according to the equation (23) and stores it in the electric power data storage means 32.

Thereafter, the second out-of-step judging means 34 checks the changing trend of the electric power Pt and the current It obtained at every time Δt as described above, and judges that the system is in the out-of-step state at the time when the current It changes from the increase trend to the decrease trend and the polarity of the total active power P is reversed.

Then, the out-of-step condition forming judging means 43 judges whether the first out-of-step judging means 24 and the second out-of-step judging means 34 judged the out-of-step, respectively, and judges that the electric power system is in the out-of-step state only when the conditions for both the first and second out-of-step judging means 24, 34 to judge the out-of-step state hold good, and so notifies the line outage control means 44. The line outage control means 44 opens the circuit breaker 42 installed in the transmission line where the voltage and the current are taken to open the transmission line.

Further, when applying this embodiment to the electric power system out-of-step detecting apparatus shown in FIG. 8, this electric power system out-of-step detecting apparatus will become such structure that the output system of the out-of-step transmission line specifying means 27 is provided with the line outage control means 44 which open the transmission line including the buses when the out-of-step transmission line specifying means 27 judges the transmission line containing the out-of-step locus. In this case, by specifying that in a transmission line the out-of-step locus is included, a line outage command is output to a circuit breaker of the specified transmission line.

So, according to such the embodiment as described above, as the presence of the out-of-step is judged using the judging results of two different out-of-step judging means 24, 34, it is possible to judge the out-of-step very accurately and improve reliability.

Figure 14:
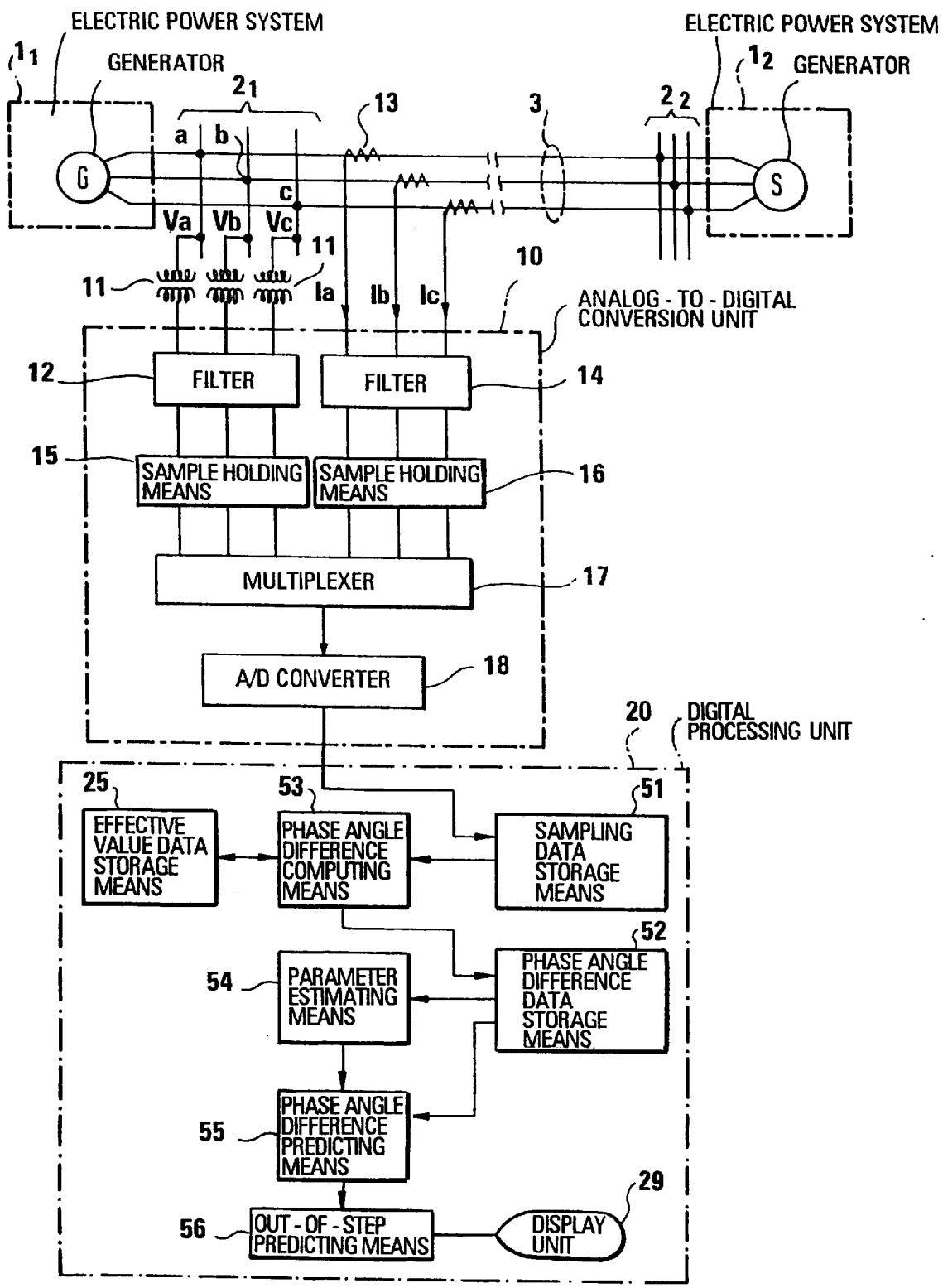
FIG. 14 is a block diagram showing a seventh embodiment of an electric power system out-of-step predicting method and an electric power system out-of-step predicting apparatus of this invention claimed in claims 8 and 9.

FIG. 14 is a block diagram for explaining a seventh embodiment of an electric power system out-of-step predicting method and an electric power system out-of-step predicting apparatus of the invention claimed in claims 8 and 9.

The analog-to-digital conversion unit 10 of this out-of-step predicting apparatus is provided with the filters 12, 14, the sample holding means 15, 16, the multiplexer 17 and the A/D converter 18 to convert analog voltages and currents from the multiplexer 17 into digital voltages and currents and to store them in a sampling data storage means 51 in digital processing unit 20.

Further, the digital processing unit 20 in the out-of-step predicting apparatus is provided with a phase angle difference computing means 53 which obtains the effective value voltage V and effective value current I using the voltages Vm-3, Vm and the currents Im-3, Im stored in the sampling data storage means 51 according to the equations (1) and (2) and stores them in the effective value data storage means 25, and on the other hand, computes the phase angle difference θ according to the equations (3), (4) and stores it in a phase angle difference data storage means 52. There are further provided a parameter estimating means 54 which estimates parameters in, for instance, a quadratic predicting equation for a phase angle difference using phase angle differences at plural past times including the present time, and a phase angle difference predicting means 55 which predicts a phase angle difference θ for a future time using, for instance, the quadratic predicting equation which has the parameters that are estimated by the parameter estimating means 54. There are further provided an out-of-step predicting means 56, in which the criterion θc of 85°–90° is present, and which specifies a future time when θ≧θc and predicts the out-of-step by comparing the phase angle difference θ predicted by the phase angle difference predicting means 55 with the criterion θc, and a display unit 29.

Next, the operation of such the apparatus as described above will be explained.

The operations of the filters 12, 14, the sample holding means 15, 16, the multiplexer 17 and the A/D converter 18 are as described above and their explanations will be omitted here.

Figure 15:
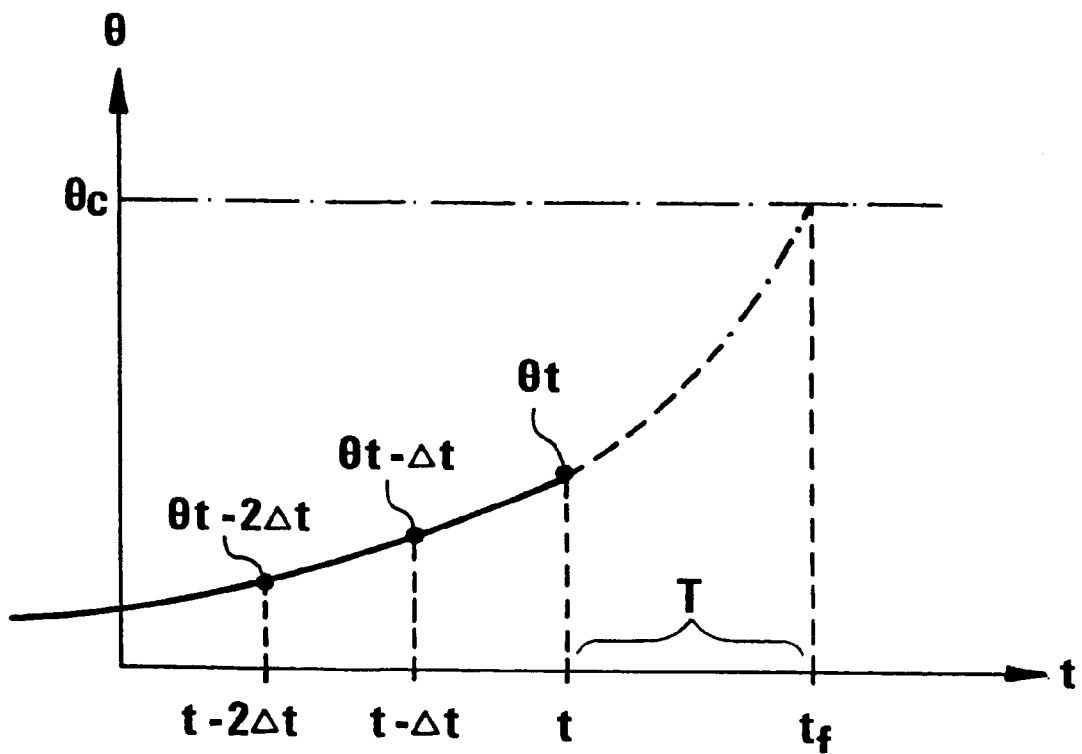
FIG. 15 is a diagram for explaining to obtain a predicted out-of-step time from the phase angle differences at plural points of time.

The phase angle difference computing means 53 obtains the effective value voltage V and the effective value current I according to the equations (1) and (2) using voltages Vm-3, Vm and currents Im-3, Im that are sampled in order, and then, computes the phase angle differences θ using the equations (3) and (4) and stores it in the phase angle difference data storage means 52. Here, as a phase angle difference θ can be expressed by the following equation (26) in case of, for instance, a quadratic predicting equation using phase differences $\theta_{t-2\Delta t}$, $\theta_{t-\Delta t}$, $\theta_t$ at plural past times including the present time, for, for instance, t−2Δt, t−Δt, t as shown in FIG. 15.

$$\theta = a \cdot t^2 + b \cdot t + c \qquad (26)$$

The parameter estimating means 54 estimates parameters a, b, c in this quadratic predicting equation and stores the estimated parameters a, b, c in the phase angle difference data storage means 52. This estimation method uses, for instance, the minimum square method.

After estimating parameters a, b, c as described above, in order to obtain a phase angle difference θ at a future time tf, the phase angle difference predicting means 55 is able to compute a predicting phase angle difference θf at the time tf after passing a time T from the present time using the equation (26) by substituting the time tf for t shown in the equation (26). Thus, it is possible to obtain the future time tf when the predicting phase angle difference θf arrives at the criterion θc of 85°–90°.

Here, by substituting for θ in the equation (26), equation (27) is obtained.

$$\theta c = a \cdot t^2 + b \cdot t + c \qquad (27)$$

By deforming the equation (27), it is expressed by $$0 = a \cdot t^2 + b \cdot t + (c - \theta c) \qquad (28)$$

When this quadratic equation is solved, equation (29) is obtained $$t = -b/2a \pm \{b^2 - 4a(c - \theta c)\}^{1/2}/2a \qquad (29)$$

Here, if $$\alpha^2 = b^2 - 4a(c - \theta c) \qquad (30)$$

the time tf when the predicting phase angle difference θf becomes θc (=90°) is obtained as follow:

$$tf = (-b + \alpha)/2a \qquad (31)$$

So, assuming that the present time is t, the out-of-step predicting means 56 is able to predict the time tf when the out-of-step is taken place by obtaining the difference T between the present time t and an out-of-step predicting time tf from the following equation:

$$T = tf - t \qquad (32)$$

Therefore, according to the embodiment described above, after obtaining phase angle differences at past plural times from sampled voltages and currents, parameters in, for instance a quadratic predicting equation, are estimated from these phase angle differences and a time when the out-of-step is taken place in the future is predicted using this secondary predicting equation containing these parameters. Therefore, it is possible to take countermeasures earlier and thereby to prevent extension of loss of synchronism to the other generators in advance.

Figure 16:
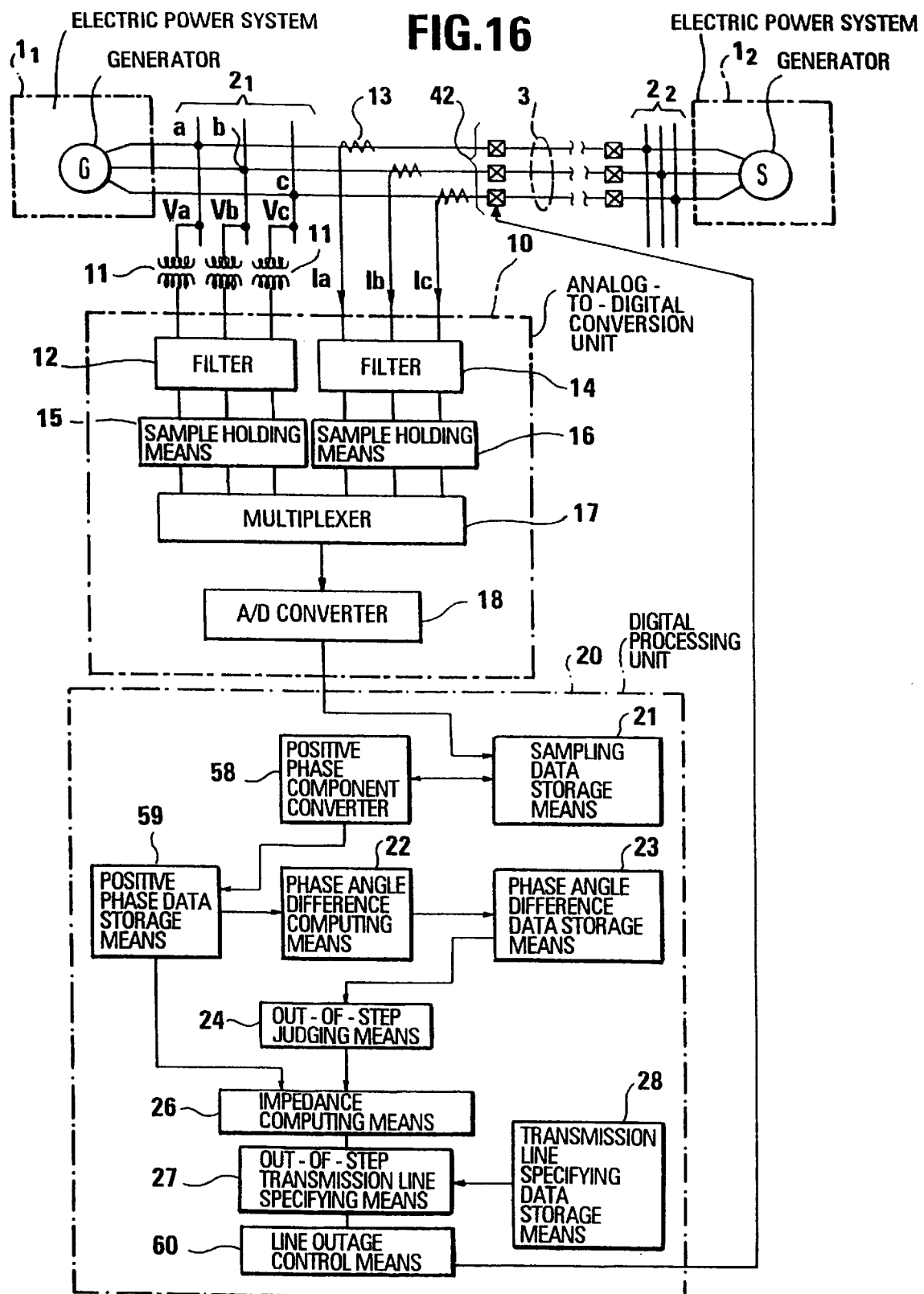
FIG. 16 is a block diagram showing an eighth embodiment of an electric power system out-of-step detecting apparatus of this invention claimed in claim 10.

FIG. 16 is a block diagram for explaining an eighth embodiment of an electric power system out-of-step detecting apparatus of the invention claimed in claim 10. As this apparatus is in the similar structure as that shown in FIG. 8, the same portions as those shown in FIG. 8 will be explained by assigning the same reference numerals.

This embodiment judges the out-of-step, regardless of the aspect of fault, using positive phase voltages and positive phase currents.

The analog-to-digital conversion unit 10 of this out-of-step detecting apparatus is provided with the sample holding means 15 to hold voltages in all phases of the bus $2_1$ via the voltage transformer 11 and the filter 12, the sample holding means 16 to hold currents in all phases of the transmission line 3 via the current transformer 13 and the filter 14, the multiplexer 17 to take in these sample held voltages and currents and the A/D converter 18 which converts voltages and currents in all phases taken by the multiplexer 17 into the digital voltages Va, Vb, Vc and the digital currents Ia, Ib, Ic in all phases and stores them in the sampling data storage means 21 in the digital processing unit 20.

In the digital processing unit 20 of this out-of-step detecting apparatus, a positive phase component converter 58 computes a positive phase voltage and a positive phase current using the voltages Va, Vb, Vc and the currents Ia, Ib, Ic in all phases and stores them in a positive phase component data storage means 59.

At the output side of this positive phase component converter 58, there are provided the phase angle difference computing means 22 which obtains phase angle difference θ between the positive phase voltage and the positive phase current and stores it in the phase angle difference data storage means 23 and the out-of-step judging means 24 to judge the out-of-step by comparing the phase angle difference θ and a criterion θc set in advance when a change amount Δθ in the phase angle differences θ at every measuring interval is below a predetermined threshold value ε for detecting sudden change in phase angle. There are further provided the impedance computing means 27 to compute an impedance for determining a place generating the out-of-step locus in the transmission line 3 using the positive phase voltage and the positive phase current when the out-of-step is judged by this out-of-step judging means 24, the out-of-step transmission line specifying means 27 which specifies a transmission line that includes the out-of-step locus by computing a distance using the impedance computed by the impedance computing means 26 and the impedance per unit distance of a transmission line that can be known in advance, and a line outage control means 60 which opens the transmission line by opening a circuit breaker 42 of the specified transmission line, and the transmission line specifying data storage means 28 which stores various data needed for specifying transmission line on which the out-of-step locus is produced.

Next, the operation of the apparatus described above will be explained.

The multiplexer 17 takes voltages and currents in all phases successively and sends them to the A/D converter 18. This A/D converter 18 converts the voltages and currents in all phases taken by the multiplexer 17 into digital voltages Va, Vb, Vc and currents Ia, Ib, Ic in all phases and stores them in the sampling data storage means 21.

Then, using the voltages Va, Vb, Vc in all phases stored in the sampling data storage means 21, the positive phase component converter 58 converts them into a positive phase voltage V1 according to the following computing equation and stores it in the positive phase component data storage means 59.

$$V1 = Va + \alpha \cdot Vb + \beta \cdot Vc \tag{33}$$

where, coefficients α, β are as follows:

$$\alpha = \cos(2\pi/3) + j \cdot \sin(2\pi/3) \tag{34}$$

$$\beta = \sin(-2\pi/3) + j \cdot \sin(2\pi/3) \tag{35}$$

The positive phase component converter 58 also converts the currents Ia, Ib, Ic in all phases into a positive phase current I1 in the similar manner and stores it in the positive phase component data storage means 59.

After converting to the positive phase voltage V1 and the positive phase current I1 as described above, the phase angle difference computing means 22 computes the phase angle differences θ between the positive phase voltage V1 and the positive phase current I1 stored in the positive phase component data storage means 59 and stores it in the phase angle difference data storage means 23.

Thereafter, using the preset criterion θc, the out-of-step judging means 24 judges the out-of-step when the phase angle differences θ stored in the phase angle difference data storage means 23 changes from the Condition 1 to the Condition 2 as shown in the equations (9) and (10). Further, in the state of the Condition 1, the electric power system is judged to be in the stable state and the out-of-step judging means 24 judges the presence of out-of-step using the phase angle difference θ obtained from the positive phase voltage V1 and the positive phase current I1 at next time repeatedly.

When the system is judged to be in the out-of-step state, using the impedance computing means 26 and the out-of-step transmission line specifying means 27, a transmission line that includes the out-of-step locus is specified.

By the way, when a phase angle difference between voltages at both ends of the transmission line becomes 180°, a point at where the voltage becomes zero, that is the out-of-step locus appears somewhere of the transmission lines. Shown in FIG. 7(a) is a voltage distribution diagram when the phase angle difference between voltages VN and VM at both ends of the transmission line becomes 180°, and A shown in this figure is the out-of-step locus point where the voltage becomes zero. Shown in FIG. 7(b) is a diagram illustrating the relation of vector between the voltage and current. Now, when the phase angle difference between the voltages VN and VM at both ends of the transmission line becomes 180°, a point where the magnitude of the voltage becomes zero will appear. After computing the impedance up to the out-of-step locus according to the equation (13) from, for instance, the voltage VN and the current I of the transmission line, it is possible to obtain a distance from the bus N to the out-of-step locus based on this computed impedance.

As the relation shown by equation (12) holds good regarding the point generating the out-of-step locus on the transmission line 3, when the phase angle difference between the positive phase voltage V1 and the positive phase current I1 is 90° as shown in FIG. 7(b), the impedance computing means 26 is able to compute the impedance Z from the equation (13).

Further, if the resistance r of the transmission line is smaller than the reactance X thereof, the reactance X becomes X=V/jI as shown in the equation (14). Though, the phase angle difference is assumed at 90°, when it is in the prescribed range, for instance, 85°–90°, the positive phase voltage V1 and the positive phase current I1 in the prescribed range may be used.

After obtaining the impedance Z as described above, the out-of-step transmission line specifying means 27 specifies whether the point generating the out-of-step locus is on the transmission line from which the positive phase voltage and the positive phase current were measured. First, an impedance value u per unit length of the transmission line is memorized in the transmission line specifying data storage means 28. Assuming that this impedance value u is (r+jx), a distance from the bus N to a point where the out-of-step locus is generated is computed according to the computing equation (15) using this impedance value u per unit length and the impedance Z computed by the impedance computing means 26. So, when the resistance r of the transmission line is disregarded, d=X/x shown in the equation (16) is obtained.

Here, the out-of-step transmission line specifying means 27 reads out the length L of the transmission line between both buses N, M out of the transmission line specifying data storage means 28, and compares the length L of the transmission line and the distance d. If the relation of d≦L shown in the equation (17) holds good, the distance d is within the length L of the transmission line and it is therefore judged that the point that becomes the out-of-step locus is in the length L of the transmission line. On the contrary, the relation is d>L as in the equation (18), it is seen that the out-of-step locus is present far away from the length L of the transmission line.

So, when the transmission line containing the point that becomes the out-of-step locus is specified, the line outage control means 60 outputs a command to open the transmission line.

Therefore, according to the above embodiment, when the phase angle difference θ between the positive phase voltage and positive phase current becomes 90°, using the positive phase voltage and current at this time, the impedance up to a specific point (the out-of-step locus) where the voltage on the transmission lines becomes zero is computed. Thereafter, a distance up to the out-of-step locus point is obtained from this computed impedance value and the preset impedance value per unit length of the transmission line. Then, this distance is compared with the overall length of the transmission line, and if the out-of-step locus is in the length of the specified transmission line connected to the buses, the transmission line is opened. Therefore, as there is a transmission line in which the phase current becomes zero after removing unbalanced faults, it is possible to specify the transmission line that includes the out-of-step locus using the positive phase voltage and the positive phase current and to open it disregarding the aspects of faults.

FIG. 17 is a block diagram for explaining a ninth embodiment of an electric power system out-of-step predicting apparatus of the invention claimed in claim 11.

In this FIG. 17, the same portions as those shown in FIGS. 1 and 14 are assigned with the same reference numerals and their detailed explanations will be omitted.

This out-of-step predicting apparatus is provided with the component elements of the reference numerals 11–18, 21–23 and 25 as described above. In addition, the digital processing unit 20 of this out-of-step predicting apparatus is provided with a phase angle difference parameter estimating means 61 which estimates parameters a, b, c in a quadratic predicting equation, if a phase angle difference is expressed by, for instance, a quadratic predicting equation, based on the equation (26) and FIG. 15 using phase angle differences at plural past times obtained by the phase angle difference computing means 22, and a phase angle difference predicting means 62 which predicts a phase angle difference θ at a future time using, for instance, a guadratic predicting equation containing parameters a, b, c estimated by the phase angle difference parameter estimating means 61. There are further provided a voltage amplitude value estimating means 63 which estimates a voltage amplitude value from the voltages stored in the effective value data storage means 25, a voltage amplitude parameter estimating means 64 which estimates voltage parameters from the voltage amplitude values up to the present time estimated at regular intervals by the voltage amplitude value estimating means 63, and a voltage amplitude value predicting means 65 which predicts a voltage amplitude value using the voltage parameters estimated by the voltage amplitude parameter estimating means 64. There are further provided a current amplitude value estimating means 66 which estimates a current amplitude value from the currents stored in the effective value data storage means 25, a current amplitude parameter estimating means 67 which estimates current parameters from the current amplitude values up to the present time estimated at regular intervals by the current amplitude value estimating means 66, and a current amplitude value predicting means 68 which predicts a current amplitude value using current parameters estimated by the current amplitude parameter estimating means 67.

Furthermore, the digital processing unit 20 of this out-of-step predicting apparatus is provided with an out-of-step predicting means 69 which predicts the out-of-step using the phase angle differences θ predicted by the phase angle difference predicting means 62 and a criterion θc that is preset at 85°–90°, an out-of-step judging means 70 which judges the presence of the out-of-step from a predicted value of the out-of-step predicting means 69, an out-of-step locus estimating means and a line outage control means 72 which opens the transmission line containing the out-of-step locus.

Next, the operation of the apparatus described above will be explained.

After the voltage and the current are sampled at a high speed using the sample holding means 15, 16, the sampled voltages and currents are, via the multiplexer 17, converted into digital voltages and currents by the A/D converter 18 and stored in the sampling data storage means 21, successively. Then, the phase angle difference computing means 22 obtains the effective value voltage V and effective value current I according to the equations (1) and (2) using the voltages Vm-3, Vm and the currents Im-3, Im that were taken at, for example 600 Hz (30°), and stored in the sampling data storage means 21 successively and stores them in the effective value data storage means 25, and on the other hand, obtains the phase angle difference θ using the equations (3) and (4) and stored it in the phase angle difference storage means 23. Then, the phase angle difference parameters are estimated by the phase angle difference parameter estimating means 61.

A phase angle difference θ can be expressed by, the following equation (36), in case of, for example, a quadratic predicting equation. The phase angle difference parameter estimating means 61 estimates parameters a, b, c in this quadratic predicting equation using phase angle differences $θ_{t-2\Delta t}, θ_{t-\Delta}, θ_t$, at the plural past times including the present time, for, for instance, t−2Δt, t−Δt, t as shown in FIG. 15.

$$θ = a·t^2 + b·t + c \tag{36}$$

This estimation method uses, for instance, the minimum square method.

After estimating parameters a, b, c as described above, the phase angle difference predicting means 62 is executed. In order to obtain a phase angle difference θ at a future time tf the phase angle difference predicting means 62 substitutes the time tf, for t shown in the equation (36) and using the equation (36), predicts whether a phase angle difference θf reaches the criterion θc of 85°–90° at the time tf after passing a time T from the present time t.

On the other hand, using the effective value voltage V stored in the effective value data storage means 25, the voltage amplitude value estimating means 63 estimates a voltage amplitude value Vm from the following equation:

$$Vm=\sqrt{2}V \quad (37)$$

Thereafter, the voltage amplitude parameter estimating means 64 estimates parameters d, e and f from the following predicting equation, interpolating the voltage amplitude values Vm estimated at regular intervals up to the present time t as shown in FIG. 18(a). For the estimation, such a known method as the minimum square method, etc. is used. Further, the voltage amplitude value predicting mans 65 predicts the voltage amplitude value Vm according to the following equation using predicted parameters d, e and f:

$$Vm=d\cdot t^2+e\cdot t+f \quad (38)$$

Further, the current amplitude value predicting means 66 estimates a current amplitude value Im in the same manner as the equation (37) using the effective value current I stored in the effective value data storage means 25. Then, the current amplitude parameter estimating means 67 estimates parameters g, h and i from the following predicting equation, interpolating the current amplitude values Im estimated at regular intervals up to the present time t as shown in FIG. 18(b). For the estimation, such a known method as the minimum square method etc. is used. Further, the current amplitude value predicting means 68 estimates the current amplitude value Im according to the following equation using predicated parameters g, h and i:

$$Im=g\cdot t^2+h\cdot t+i \quad (39)$$

Further, the out-of-step predicting means 69 substitutes θc for the phase angle difference θ in the equation (36), and after obtaining a future time tf when the out-of-step can be predicted using the equations (27)–(31), if the present time is t, obtains a time difference T between the present time t and the time tf when the out-of-step can be predicted as follows:

$$T=tf-t \quad (40)$$

Then, the out-of-step judging means 70 judges whether the system becomes out-of-step from the predicted time tf. If judged that it does not become in the out-of-step, at the predicted time tf, a series of processes are repeated again on sampling data of the next time.

On the other hand, when judged the out-of-step, in the out-of-step judging means 70, the out-of-step locus estimating means 71 obtains a voltage amplitude value Vp at the future time tf from the voltage amplitude value predicting means 65 by substituting tf for t in the equation (38) containing parameters d, e and f as shown in FIG. 18(a). Further, the out-of-step locus estimating means 71 also obtains a current amplitude value Ip at the future time tf from the current amplitude value predicting means 68 by substituting tf for t in the equation (39) containing parameters g, h and i as shown in FIG. 18(b).

Then, using the predicted voltage Vp and the predicted current Ip, the out-of-step locus estimating means 71 computes a reactance X from the following computing equation (see FIG. 19):

$$Vp=-Ip\cdot X \quad (41)$$

Further, as a reactance value u of impedance per unit length of the transmission line is memorized in the transmission line specifying data storage means 73, the out-of-step locus estimating means 71 obtains a distance d from the measuring point using the reactances X and u according to the following equation (42).

$$d=X/u \quad (42)$$

So, the out-of-step locus estimating means 71 reads out the length L of the transmission line between the buses N and M from the transmission line specifying data storage means 73, compares the length L of this transmission line and the distance d. If the relation of d≦L holds goods, it judges that the out-of-step locus is included in the transmission line L. If they are in the relation of d>L, it is seen that the out-of-step locus is present far away from the transmission line L.

However, when considering the effect of error, if they are in the relation d≦αL (for instance, α=0.95), the out-of-step locus is judged to be present in the transmission line where voltage and current were measured.

When the transmission line containing the out-of-step locus is thus specified, the line outage control means 72 sends a command to open the transmission line to the circuit breaker 42 installed to the transmission line where the out-of-step locus is present.

So, according to the embodiment described above, it is possible to open the transmission line earlier by using the phase angle difference, voltage and current at the future point of time tf, such an adverse effects as load drop resulting from the voltage drop can be prevented in advance.

According to the present invention described above, various effects are obtained as described below.

According to the invention claimed in claims 1 through 3, it is possible to judge the out-of-step at high accuracy by measuring voltages and currents of a transmission line including buses in an electric power system without setting various zones as before or without using special data communication means as before.

According to the invention claimed in claims 4 and 5, it is possible to obtain an impedance up to an out-of-step locus of a transmission line by measuring voltages and currents of the transmission line including buses in an electric power system without setting various zones as before or without using special data communication means as before.

According to the invention claimed in claim 6, it is possible to easily judge whether an out-of-step is in a specific transmission line connected to buses in an electric power system.

According to the invention claimed in claim 7, it is possible to easily judge an out-of-step of generator groups at both sides of a transmission line in an electric power system from the polarity inversion of an electric power of the transmission line linking buses.

According to the invention claimed in claims 8 and 9, it is possible to predict a time until an electric power system becomes out-of-step in advance, to take required countermeasures earlier and to prevent extension of loss of synchronism to the other generators in advance.

According to the invention claimed in claim 10, it is possible to judge an out-of-step in an electric power system regardless of the aspect of faults by using positive phase voltages and currents although phase currents of a transmission line may become zero after removing the faults.

According to the invention claimed in claim 11, as parameters of predicting equations are estimated from voltages and currents at plural points of time of a transmission line including buses and the out-of-step is predicted using these predicting equations including estimated parameters, it is possible to open the transmission line and to prevent adverse effect of, such as, the load drop resulting from the voltage drop.

Obviously, numerous modifications and variation of the present invention are possible in light of the above teachings. It is therefore to be understood that within the scope of the appended claims, the invention may be practiced otherwise than as specifically described herein.

What is claimed is:

1. A method for detecting an out-of-step in an electric power system in which two power sub-systems are connected at both sides of a transmission line, said method comprising the steps of:

taking in a voltage and a current of said electric power system at regular measuring intervals;

computing a phase angle difference between said voltage and said current taken by said voltage and current taking step; and judging an out-of-step condition by receiving said phase angle difference, obtaining a change amount in phase angle differences at every measuring interval, and judging that an out-of-step occurs between said two power sub-systems in said electric power system when said change amount in said phase angle differences is below a predetermined threshold value for detecting a sudden change in phase angle and said phase angle difference is above a preset out-of-step judging phase angle difference.

2. An apparatus for detecting an out-of-step in an electric power system in which two power sub-systems are connected at both sides of a transmission line, said apparatus comprising:

voltage and current taking means for taking in a voltage and a current respectively of said electric power system at regular measuring intervals;

phase angle difference computing means for computing a phase angle difference between said voltage and said current taken by said voltage and current taking means; and out-of-step judging means connected to receive said phase angle difference for obtaining a change amount in phase angle differences at every measuring interval and for judging that an out-of-step occurs between said two power sub-systems in said electric power system when said change amount in said phase angle differences is below a predetermined threshold value for detecting sudden change in phase angle and said phase angle difference is above a preset out-of-step judging phase angle difference.

3. An apparatus for detecting an out-of-step in an electric power system in which two power sub-systems are connected at both sides of a transmission line, said apparatus comprising:

voltage and current taking means for taking in a voltage and a current respectively of said electric power system at regular measuring intervals;

sampling means for sampling said voltage and said current taken by said voltage and current taking means at a shorter interval than a fundamental period of said voltage and current;

phase angle difference computing means for computing an effective value voltage and an effective value current by said sampled voltage and said sampled current sampled by said sampling means and for computing a phase angle difference between said effective value voltage and said effective value current; and out-of-step judging means connected to receive phase angle difference for obtaining a change amount in said phase angle differences at every measuring interval and for judging that an out-of-step occurs between said two power sub-systems in said electric power system when said change amount in said phase angle differences is below a predetermined threshold value for detecting sudden change in phase angle and said phase angle difference is above a preset out-of-step judging phase angle difference.

4. The apparatus according to claim 3, further comprising:

impedance computing means for computing an impedance to a point where said voltage on said transmission line becomes zero using said effective value voltage and said effective value current at a time when said out-of-step in said electric power system is judged, so as to obtain an out-of-step locus of said electric power system.

5. The apparatus according to claim 4, further comprising:

out-of-step transmission line specifying means for computing a distance using said impedance computed by said impedance computing means and an impedance per unit length of said transmission line and for specifying said transmission line which includes said out-of-step locus based on said distance.

6. A method for detecting an out-of-step in an electric power system in which two power sub-systems are connected at both sides of a transmission line, said method comprising the steps of:

taking in a voltage and a current of said electric power system at regular measuring intervals;

computing a phase angle difference between said voltage and said current taken by said voltage and current taking step;

judging an out-of-step condition by receiving said phase angle difference, obtaining a change amount in phase angle differences at every measuring interval, and judging that an out-of-step occurs between said two power sub-systems in said electric power system when said change amount in said phase angle differences is below a predetermined threshold value for detecting sudden change in phase angle and said phase angle difference is above a preset out-of-step judging phase angle difference; and computing an impedance to a point where said voltage on said transmission line becomes zero using said voltage and said current at a time when said out-of-step in said electric power system is judged, so as to obtain an out-of-step locus of said electric power system.

7. An apparatus for detecting an out-of-step in an electric power system in which two power sub-systems are connected at both sides of a transmission line, said apparatus comprising:

voltage and current taking means for taking in voltages and currents respectively in all phases of said electric power system at regular measuring intervals;

electric power processing means for computing active powers in all phases using said voltages and said currents in all phases of said electric power system and for computing a total active power by adding said active powers in all phases; and out-of-step judging means connected to receive said total active power from said electric power processing means and one of said currents in all phases from said voltage and current taking means for judging that an out-of-step occurs between said two power sub-systems in said electric power system when said one of said currents changes from an increasing trend to a decreasing trend and a polarity of said total active power is reversed.

8. A method for predicting an out-of-step in an electric power system in which two power sub-systems are connected at both sides of a transmission line, said method comprising the steps of:

taking in a voltage and a current of said electric power system at regular measuring intervals;

computing a phase angle difference between said voltage and said current taken by said voltage and current taking step;

estimating parameters in a predicting equation for predicting a future phase angle difference using a plurality of said phase angle differences computed by said phase angle difference computing step;

predicting a future phase angle difference using said predicting equation obtained by using said parameters estimated by said parameter estimating step; and predicting an out-of-step condition between said two sub-systems by receiving said future phase angle difference and predicting a future out-of-step time when said future phase angle difference predicted by said phase angle difference predicting step reaches a preset out-of-step judging phase angle difference.

9. An apparatus for predicting an out-of-step in an electric power system in which two power sub-systems are connected at both sides of a transmission line, said apparatus comprising:

voltage and current taking means for taking in a voltage and a current respectively of said electric power system at regular measuring intervals;

phase angle difference computing means for computing a phase angle difference between said voltage and said current taken by said voltage and current taking means;

parameter estimating means for estimating parameters in a predicting equation for predicting a future phase angle difference using a plurality of said phase angle differences computed by said phase angle difference computing means;

phase angle difference predicting means for predicting a future phase angle difference using said predicting equation obtained by using said parameters estimated by said parameter estimating means; and out-of-step predicting means for receiving said future phase angle difference and for predicting a future out-of-step time when said future phase angle difference predicted by said phase angle difference predicting means reaches a preset out-of-step judging phase angle difference.

10. An apparatus for detecting an out-of-step in an electric power system in which two power sub-systems are connected at both sides of a transmission line, said apparatus comprising:

voltage and current taking means for taking in voltages and currents in all phases of said electric power system at regular measuring intervals;

positive phase component conversion means for converting said voltages and said currents in all phases of said electric power system taken in said voltage and current taking means into a positive phase voltage and a positive phase current;

phase angle difference computing means for computing a phase angle difference between said positive phase voltage and said positive phase current;

out-of-step judging means for receiving said phase angle difference, for obtaining a change amount in phase angle differences at every measuring interval and for judging that an out-of-step occurs between said two power sub-systems in said electric power system when said change amount in said phase angle differences is below a predetermined threshold value for detecting sudden change in phase angle and said phase angle difference is above a preset out-of-step judging phase angle difference;

impedance computing means for computing an impedance to a point where said voltage on said transmission line becomes zero using said positive phase voltage and said positive phase current at a time when said out-of-step in said electric power system is judged, so as to obtain an out-of-step locus of said electric power system; and out-of-step transmission line specifying means for computing a distance using said impedance computed by said impedance computing means and an impedance per unit length of said transmission line and for specifying said transmission line which includes said out-of-step locus based on said distance.

11. An apparatus for predicting an out-of-step in an electric power system in which two power sub-systems are connected at both sides of a transmission line, said apparatus comprising:

voltage and current taking means for taking in a voltage and a current of said electric power system at regular measuring intervals;

phase angle difference computing means for computing a phase angle difference between said voltage and said current taken by said voltage and current taking means;

phase angle difference parameter estimating means for estimating phase angle difference parameters in a phase angle difference predicting equation for predicting a future phase angle difference using a plurality of said phase angle differences computed by said phase angle difference computing means;

phase angle difference predicting means for predicting a future phase angle difference using said phase angle difference predicting equation obtained by using said phase angle difference parameters estimated by said phase angle difference parameter estimating means;

out-of-step predicting means for receiving said future phase angle difference and for a future predicted out-of-step time when said future phase angle difference predicted by said phase angle difference predicting means reaches a preset out-of-step judging phase angle difference;

out-of-step judging means for judging that an out-of-step occurs between said two power sub-systems in said electric power system based on said predicted out-of-step time; voltage amplitude value estimating means for estimating a voltage amplitude value of said voltage taken in said voltage and current taking means;

voltage amplitude value parameter estimating means for estimating voltage amplitude value parameters in a voltage amplitude value predicting equation for predicting a future voltage amplitude value using a plurality of said voltage amplitude values estimated by said voltage amplitude value estimating means;

voltage amplitude value predicting means for predicting a future voltage amplitude value time using said voltage amplitude value predicting equation obtained by using said voltage amplitude value parameters estimated by said voltage amplitude value parameter estimating means;

current amplitude value estimating means for estimating a current amplitude value of said current taken in said voltage and current taking means;

current amplitude value parameter estimating means for estimating current amplitude value parameters in a current amplitude value predicting equation for predicting a future current amplitude value using a plurality of said current amplitude values estimated by said current amplitude value estimating means;

current amplitude value predicting means for predicting a future current amplitude value using said current amplitude value predicting equation obtained by using said current amplitude value parameters estimated by said current amplitude value parameter estimating means; and out-of-step locus estimating means for estimating whether an out-of-step locus is included in said transmission line using said future voltage amplitude value and said future current amplitude value at a time when said out-of-step in said electric power system is judged, so as to obtain an out-of-step locus of said electric power system.

* * * * *